United States Patent
Shah et al.

(10) Patent No.: US 12,130,495 B1
(45) Date of Patent: Oct. 29, 2024

(54) FLANGELESS OPTICAL ASSEMBLY FOR RECEIVING GLUE DISPENSE

(71) Applicant: Apple Inc., Cupertino, CA (US)

(72) Inventors: Paulom Shah, San Jose, CA (US); Aurelien R Hubert, San Jose, CA (US); Ho Seop Jeong, Palo Alto, CA (US); Julien C Vittu, Saratoga, CA (US); Qiang Yang, Fremont, CA (US)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 17/722,114

(22) Filed: Apr. 15, 2022

(51) Int. Cl.
| | | |
|---|---|---|
| *G02B 7/14* | (2021.01) | |
| *G02B 7/02* | (2021.01) | |
| *G03B 13/36* | (2021.01) | |
| *G03B 17/08* | (2021.01) | |
| *H02K 41/035* | (2006.01) | |

(52) U.S. Cl.
CPC ............ *G02B 7/14* (2013.01); *G02B 7/022* (2013.01); *G03B 13/36* (2013.01); *G03B 17/08* (2013.01); *H02K 41/0354* (2013.01)

(58) Field of Classification Search
CPC .............................. G02B 7/022; G02B 7/025
See application file for complete search history.

(56) References Cited

U.S. PATENT DOCUMENTS

| | | | | |
|---|---|---|---|---|
| 2010/0025792 A1* | 2/2010 | Yamada | ................. | H04N 23/55 |
| | | | | 257/E31.127 |
| 2018/0348471 A1* | 12/2018 | Lin | ........................ | G02B 7/022 |
| 2018/0364441 A1* | 12/2018 | Hubert | ................... | H04N 23/57 |
| 2021/0103119 A1* | 4/2021 | Reckker | ................ | H04N 23/55 |
| 2022/0377214 A1* | 11/2022 | Ohara | ...................... | G03B 3/02 |

* cited by examiner

*Primary Examiner* — Noam Reisner
(74) *Attorney, Agent, or Firm* — Robert C. Kowert; Kowert, Hood, Munyon, Rankin & Goetzel, P.C.

(57) ABSTRACT

Various embodiments include an engaging arrangement that may be used to attach a lens barrel to a lens carrier of a camera. In some embodiments, the engaging arrangement may restrict movement of the lens barrel relative to the lens carrier along at least an optical axis. In various examples, the engaging arrangement may include one or more grooves and one or more protrusions. For instance, a groove may be defined by the lens barrel or the lens carrier, and a protrusion may extend from the lens barrel or the lens carrier to at least partially into the groove. In some cases, the engaging arrangement may include an adhesive positioned continuously 360 degrees around the engaging arrangement between the lens barrel and the lens carrier.

20 Claims, 11 Drawing Sheets

FLANGELESS OPTICAL ASSEMBLY FOR RECEIVING GLUE DISPENSE

BACKGROUND

Technical Field

This disclosure relates generally to an engaging arrangement for attaching a lens barrel to a lens carrier of an optical assembly of a camera.

Description of the Related Art

The advent of small, mobile multipurpose devices such as smartphones and tablet or pad devices has resulted in a need for high-resolution, small form factor cameras for integration in the devices. Some small form factor cameras may include a lens barrel that is threaded so that it can be fastened to another camera component. Furthermore, some small form factor cameras may include a lens barrel that is bonded to another camera component using an adhesive. In some such designs, the bond between the lens barrel and the other camera component may be fragile due to the adhesive being primarily in tension and/or shear under certain circumstances (e.g., a drop event), and therefore the lens barrel may tend to detach from the other camera component.

Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis (referred to as the Z axis) of the camera to refocus the camera.

In some aspects, once the image sensor is attached to a camera module, the image sensor becomes a static component. During attachment of the lens, the lens may be aligned with the image sensor for a sharper image. In some aspects, both the lens and the image sensor may tilt and have compliance in the Z axis adding to the complexity of aligning the optical axes to maintain sharp focus.

SUMMARY OF EMBODIMENTS

Some embodiments include a device. The device may include an optical assembly having a lens barrel and a lens carrier. The lens barrel may hold one or more lens elements that define an optical axis. The lens carrier may be attached to the lens barrel at least partially via an engaging arrangement. In some aspects, the engaging arrangement may include at least one of a coupling arrangement or a contacting arrangement. In some instances, the engaging arrangement may restrict movement of the lens barrel relative to the lens carrier in at least one direction along the optical axis.

According to some examples, the engaging arrangement may include a groove and a protrusion. The groove may be defined by the lens barrel or the lens carrier. The protrusion may extend from the lens barrel or the lens carrier and at least partially into the groove. Furthermore, the device may include an adhesive. The adhesive may be dispensed within the engaging arrangement between the lens barrel and the lens carrier. For example, the device may include a gap extending 360 degrees around the optical axis and between the lens barrel and the lens carrier. The adhesive may be dispensed or positioned into the gap continuously along the entire length of the gap (e.g., 360 degrees around the optical axis) and within the engaging arrangement between the lens barrel and the lens carrier. Dispensing or positioning the adhesive into the gap along an entire length of the gap within the engaging arrangement may provide even distribution of the adhesive around the engaging arrangement thereby reducing the risk of delamination and reducing the risk that the lens barrel may tilt within the lens carrier.

In some embodiments, the gap may include chamfers defined by the lens barrel and/or the lens carrier. The chamfers may be positioned at an inlet of the gap and provide an extended distance across the gap for the adhesive to be introduced into the gap within the engaging arrangement between the lens barrel and the lens carrier. According to some embodiments, the engaging arrangement may be configured such that, when the adhesive is introduced into the gap, the adhesive travels to at least partially fill the gap within the engaging arrangement between the lens barrel and the lens carrier.

In some examples, the engaging arrangement may include an coupling arrangement. For example, the coupling arrangement may include an upper protrusion and one or more lower protrusions spaced vertically (Z-axis) by a groove. The coupling arrangement may also include one or more coupling protrusions. The one or more coupling protrusions may be configured to extend into the groove between the upper protrusion and at least one lower protrusion of the one or more the lower protrusions, respectively. The coupling arrangement may restrict movement of the lens barrel relative to the lens carrier in at least one or more directions along the optical axis. For example, the coupling arrangement may restrict movement in the positive vertical direction and/or restrict movement in the negative vertical direction. When an adhesive is dispensed or positioned 360 degrees around the groove within the coupling arrangement, compression in the positive vertical direction on the adhesive between the one or more coupling protrusions and the one or more lower protrusions may reduce the risk of delamination and reduce the risk that the lens barrel may tilt within the lens carrier.

Additionally, or alternatively, when an adhesive is dispensed or positioned continuously 360 degrees around the groove within the coupling arrangement, compression in the negative vertical direction on the adhesive between the one or more coupling protrusions and the upper protrusion may reduce the risk of delamination and reduce the risk that the lens barrel may tilt within the lens carrier. The coupling arrangement may restrict movement of the lens barrel relative to the lens carrier in at least one direction along the optical axis. For example, the coupling arrangement may restrict movement of the lens barrel in the negative vertical direction and/or restrict movement in the positive vertical direction. When an adhesive is dispensed or positioned continuously 360 degrees around the groove within the coupling arrangement, compression in the negative vertical direction on the adhesive between the one or more coupling protrusions and the one or more lower protrusions may reduce the risk of delamination and reduce the risk that the lens barrel may tilt within the lens carrier.

In some examples, the engaging arrangement may include a contacting arrangement. For example, the contacting arrangement may include an upper protrusion and a lower protrusion. The lower protrusion may fit into a groove formed by the upper protrusion when the lens barrel is received by the lens carrier. In some aspects, the contacting arrangement may be a z-stopper arrangement. The contacting arrangement may restrict movement of the lens barrel relative to the lens carrier in at least one direction along the optical axis. For example, the contacting arrangement may restrict movement of the lens barrel in the negative vertical direction. When an adhesive is dispensed or positioned continuously 360 degrees around the groove within the contacting arrangement, compression in the negative vertical direction on the adhesive in the groove between the upper protrusion and the lower protrusion may reduce the risk of delamination and reduce the risk that the lens barrel may tilt within the lens carrier.

In some aspects, when the lens barrel is configured to be inserted through an upper opening of a central cavity of the lens carrier and into the central cavity of the lens carrier, the upper protrusion, the one or more lower protrusions, and the groove may be positioned on an exterior surface of the lens barrel and the one or more coupling protrusions may be positioned on an interior surface of the lens carrier forming the central cavity. The upper protrusion may extend completely around the exterior surface of the lens barrel. The one or more lower protrusions may extend around a portion (e.g., a circumferential length) of the exterior surface of the lens barrel that is less than an entire circumference around the exterior surface of the lens barrel.

The one or more lower protrusions extending around a portion of the exterior surface of the lens barrel that is less than the entire circumference around the exterior surface of the lens barrel may form one or more spaces on the exterior surface of the lens barrel between the one or more lower protrusions. The one or more spaces may be vertically aligned along the exterior surface of the lens barrel with the one or more lower protrusions and may be sized to permit an coupling protrusion positioned on the interior surface of the lens carrier to pass between the one or more lower protrusions and into the groove.

After the lens barrel is inserted through the upper opening and into the central cavity of the lens carrier, the lens barrel may be positioned (e.g., rotated) so that the one or more coupling protrusions are aligned with the one or more spaces formed between the one or more lower protrusions. When the one or more coupling protrusions are aligned with the one or more spaces formed between the one or more lower protrusions, the lens barrel may be further inserted into the central cavity of the lens carrier so that the one or more coupling protrusions vertically pass by the one or more lower protrusions and move into the groove. The one or more coupling protrusions may vertically move into the groove until the coupling protrusions engage the upper protrusion on the exterior surface of the lens barrel.

Subsequently, the lens barrel may be rotated within the central cavity of the lens carrier so that the one or more coupling protrusions are not aligned with the one or more spaces and form the coupling arrangement so that the one or more coupling protrusions engage the one or more lower protrusions when the lens barrel is moved towards the upper opening and/or so that the one or more coupling protrusions engage the one or more upper protrusions when the lens barrel is moved away from the upper opening. In some instances, the coupling arrangement may restrict movement of the lens barrel relative to the lens carrier in at least one direction along the optical axis.

An adhesive may be disposed into a gap formed between the exterior surface of the lens barrel and the interior surface of the lens carrier. The adhesive may be dispensed or positioned into the gap continuously along an entire length of the gap (e.g., 360 degrees around the optical axis) and within the coupling arrangement. Dispensing or positioning the adhesive into the gap continuously along an entire length of the gap within the coupling arrangement may provide even distribution of the adhesive around the coupling arrangement thereby reducing the risk of delamination and reducing the risk that the lens barrel may tilt within the lens carrier.

In some examples, at least a first portion of the adhesive may be in compression when force is applied to the lens barrel in a first direction. For example, the first direction may be parallel to the optical axis. Additionally, or alternatively, at least a second portion of the adhesive may be in compression when force is applied to the lens barrel in a second direction. For instance, the second direction may be opposite the first direction.

Some embodiments include a camera module. The camera module may include one or more lens elements that define an optical axis, a lens barrel that holds the lens elements, a lens carrier, and an engaging arrangement to attach the lens barrel to the lens carrier. According to various embodiments, the engaging arrangement may include one or more grooves and one or more protrusions. The grooves may be defined by the lens barrel and/or the lens carrier. The protrusions may extend from the lens barrel and/or the lens carrier. For example, each respective protrusion may extend at least partially into a respective groove. In some aspects, an adhesive may be disposed or positioned in a gap formed between the one or more grooves and the one or more protrusions. The adhesive may be dispensed or positioned into the gap continuously along an entire length of the gap (e.g., 360 degrees around lens carrier and at least partially fill the gap between the one or more grooves and the one or more protrusions. In various embodiments, one or more portions of the adhesive may be in compression in a first direction along the optical axis and/or in a second direction opposite the first direction along the optical axis when force is applied to the lens barrel or the lens carrier in one or more directions parallel to the optical axis.

Some embodiments include a method of assembling a camera module having an engaging arrangement. The method may include inserting a lens barrel at least partially into a lens carrier such that a protrusion of the engaging arrangement extends from the lens barrel or the lens carrier and at least partially into a first portion of a groove of the engaging arrangement. The groove may be defined by the lens barrel or the lens carrier. In some cases, the method may include rotating the lens barrel about an optical axis defined by one or more lens elements held by the lens barrel, such that the protrusion extends at least partially into a second portion of the groove. Furthermore, the method may include dispensing an adhesive into a gap that is formed between the one or more protrusions and the one or more groves on the lens barrel and 360 degrees around the lens barrel. For instance, the adhesive may be dispensed into the gap such that the adhesive travels to at least partially fill the gap within the engaging arrangement between the lens barrel and the lens carrier. In some aspects, the adhesive may be dispensed or positioned on the one or more protrusions and/or the one or more grooves of the engaging arrangement located on an interior surface of the lens carrier before the lens barrel is inserted into the lens carrier. In some aspects, the adhesive may be dispensed into the gap between the one or more protrusions and/or the one or more grooves of the engaging arrangement through one or more chamfers on the lens barrel and/or the lens carrier after the lens barrel is inserted into the lens carrier.

Figure 1:
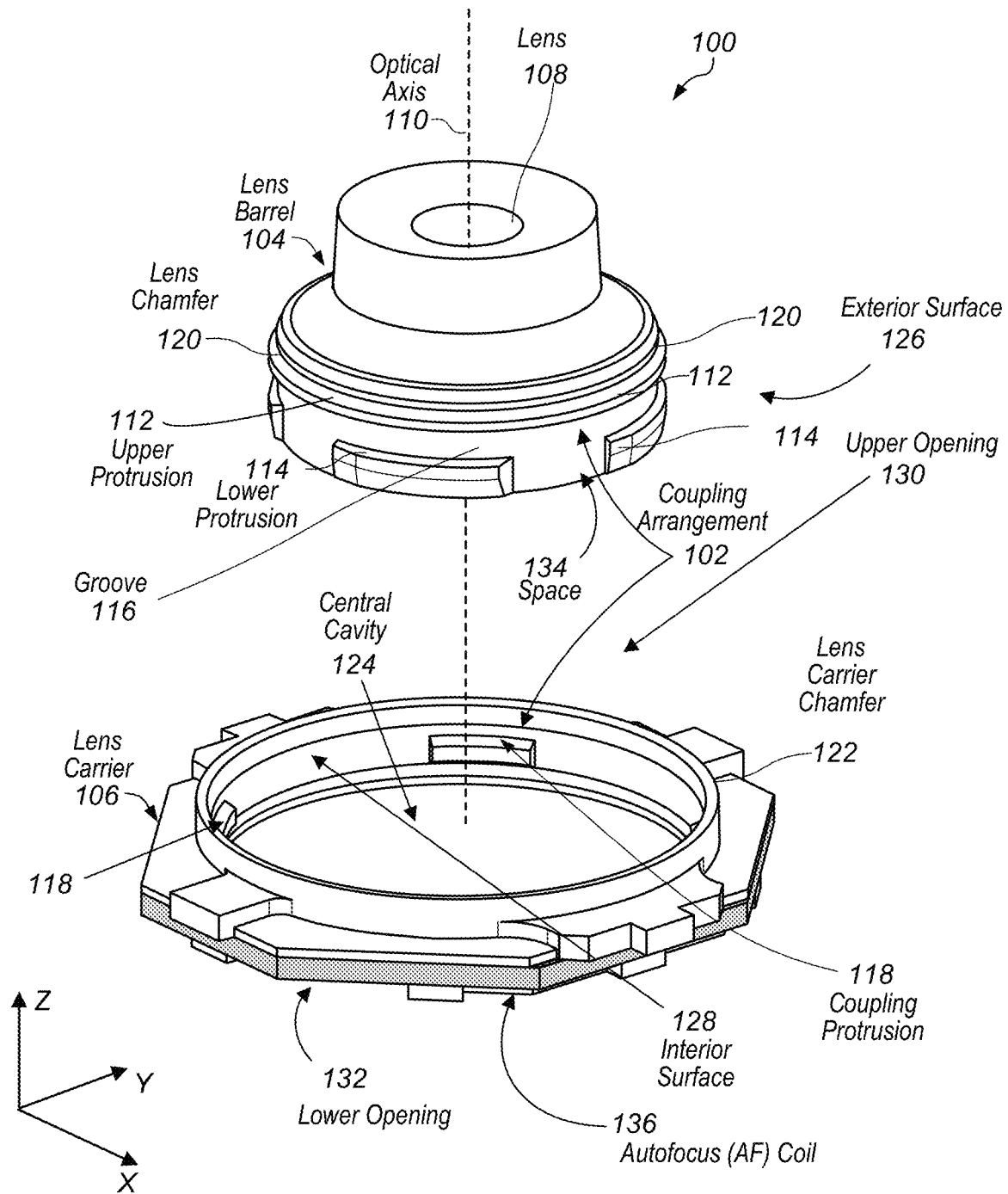
FIG. 1 illustrates a perspective view of an example camera module that includes an example coupling arrangement for attaching a lens barrel to a lens carrier according to some aspects.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Some embodiments include camera equipment outfitted with an engaging arrangement that may be used to attach a lens barrel to a lens carrier of an optical assembly. In some aspects, the engaging arrangement may include at least one of a coupling arrangement or a contacting arrangement. In some instances, the engaging arrangement may restrict movement of the lens barrel relative to the lens carrier in at least one direction along the optical axis. In various examples, the lens barrel and/or the lens carrier may be threadless, e.g., the lens barrel and the lens carrier may not have a matching pair of male-female threads.

In some embodiments, a device may include a lens barrel and a lens carrier. The lens barrel may hold one or more lens elements that define an optical axis. The lens carrier may be attached to the lens barrel at least partially via an engaging arrangement. In some instances, the engaging arrangement may restrict movement of the lens barrel relative to the lens carrier in at least one direction along the optical axis.

According to some examples, the engaging arrangement may include a groove and a protrusion. As used herein, the term "groove" may refer to a channel that is sized such that the protrusion may fit at least partially into the channel and move along the channel when the lens barrel is inserted into the lens carrier. As used herein, the term "recess" may refer to an opening that is sized and positioned such that when the lens barrel is in a certain position within the lens carrier, a channel is formed such that adhesive may be introduced into a groove through the channel, but the channel is sized such that the protrusion cannot pass through the channel.

The groove may be defined by the lens barrel or the lens carrier. The protrusion may extend from the lens barrel or the lens carrier to at least partially into the groove. For instance, the protrusion may extend towards the groove in a direction that is at a non-orthogonal angle to the optical axis. In some cases, the groove may be a Z-shaped groove and/or an angled groove formed circumferentially along an outer periphery of the lens barrel or an inner periphery of the lens carrier.

Furthermore, the engaging arrangement may include an adhesive. The adhesive may at least partially fill a gap extending 360 degrees around the lens barrel and within the engaging arrangement between the lens barrel and the lens carrier. In some embodiments, the engaging arrangement may include a recess (e.g., a chamfered recess) defined by the lens barrel and/or the lens carrier. The recess may provide an inlet for the adhesive to be introduced to the gaps within the engaging arrangement between the lens barrel and the lens carrier. According to some embodiments, the engaging arrangement may be configured such that, when the adhesive is introduced via the recess, the adhesive travels via capillary effect to at least partially fill the gap within the engaging arrangement between the lens barrel and the lens carrier. For instance, the engaging arrangement may form a channel between the lens barrel and the lens carrier that is sized such that, when the adhesive is introduced via the recess, the adhesive traverses the channel via capillary effect to at least partially fill the gap within the engaging arrangement between the lens barrel and the lens carrier.

In some examples, at least a first portion of the adhesive may be in compression when force is applied to the lens barrel in a first direction. For example, the first direction may be parallel to the optical axis. Additionally, or alternatively, at least a second portion of the adhesive may be in compression when force is applied to the lens barrel in a second direction. For instance, the second direction may be opposite the first direction.

In some cases, the engagement arrangement may include a coupling arrangement having multiple grooves and multiple protrusions. For instance, the coupling arrangement may include a first groove defined by the lens barrel or the lens carrier, and another groove defined by the lens barrel or the lens carrier. When the lens barrel is attached to the lens carrier via the coupling arrangement, the first groove and the second groove may be opposite one another with respect to the lens barrel. Furthermore, the coupling arrangement may include a first protrusion that extends from the lens barrel or the lens carrier to at least partially into the first groove, and a second protrusion that extends from the lens barrel or the lens carrier to at least partially into the second groove. When the lens barrel is attached to the lens carrier via the coupling arrangement, the first protrusion and the second protrusion may be opposite one another with respect to the lens barrel.

In some embodiments, the device may be a mobile device (e.g., a mobile multifunction device). The mobile device may include a camera module. The lens barrel, the lens carrier, and the engaging arrangement may be part of the camera module. The camera module may further include an image sensor configured to capture light passing through the lens elements and convert the captured light into image signals. Furthermore, the camera module may include a lens actuator to move the lens carrier relative to the image sensor (and/or to move the image sensor relative to the lens carrier). The mobile device may further include a display and one or more processors in some embodiments.

In some cases, the processors may be configured to cause the lens actuator (e.g., a voice coil motor (VCM) actuator, a microelectromechanical systems (MEMS) actuator, etc.) to move the lens carrier relative to the image sensor and/or to move the image sensor relative to the lens carrier, e.g., to provide autofocus and/or optical image stabilization functionality. In some examples, the processors may be configured to cause the display to present an image based at least in part on one or more image signals from the image sensor.

In some embodiments, a camera module may include one or more elements that define an optical axis, a lens barrel that holds the one or more lens elements, a lens carrier, and an engaging arrangement to attach the lens barrel to the lens carrier. According to various embodiments, the engaging arrangement may include one or more grooves and one or more protrusions. The grooves may be defined by the lens barrel and/or the lens carrier. The protrusions may extend from the lens barrel and/or the lens carrier. For example, each respective protrusion may extend at least partially into a respective groove. In some aspects, an adhesive may be disposed in a gap formed between the one or more grooves and the one or more protrusions. The adhesive may be dispensed into the gap along an entire length of the gap (e.g., 360 degrees around lens carrier and at least partially fill the gap between the one or more grooves and the one or more protrusions. In various embodiments, one or more portions of the adhesive may be in compression in a first direction along the optical axis and/or in a second direction opposite the first direction along the optical axis when force is applied to the lens barrel or the lens carrier in directions parallel to the optical axis.

In some examples, the engaging arrangement may include a recess (e.g., a chamfered recess) defined by the lens barrel. For instance, the recess may provide a respective inlet for the adhesive to be introduced to the gap within the engaging arrangement. In some embodiments, when the adhesive is introduced via the recess, the adhesive may travel via capillary effect to at least partially fill the gap within the engaging arrangement between the lens barrel and the lens carrier. For instance, the engaging arrangement may form one or more channels between the lens barrel and the lens carrier. The channel may be sized such that, when the adhesive is introduced via the recesses, the adhesive traverses the channels via capillary effect to at least partially fill the gap within the engaging arrangement between the lens barrel and the lens carrier.

In some cases, at least a first portion of the adhesive may be in compression when force is applied to the lens barrel in a first direction that is parallel to the optical axis. Additionally, or alternatively, at least a second portion of the adhesive may be in compression when force is applied to the lens barrel in a second direction that is opposite the first direction.

According to some examples, the grooves may include a first groove defined by the lens carrier. The protrusions may include a first protrusion that extends from the lens barrel to at least partially into the first groove. The engaging arrangement may include a first recess defined by the lens barrel and/or the lens carrier, and located proximate the first protrusion. For instance, the first recess may be located above the first protrusion. The first recess may provide a first inlet for the adhesive to be introduced to gaps within the engaging arrangement between surfaces of the first groove and the first protrusion. In some cases, the grooves may include a second groove defined by the lens carrier. The protrusions may include a second protrusion that extends from the lens barrel to at least partially into the second groove. The second protrusion may be opposite the first protrusion with respect to the lens barrel in some cases. Furthermore, the engaging arrangement may include a second recess defined by the lens barrel and/or the lens carrier, and located proximate the second protrusion. For instance, the second recess may be located above the second protrusion. The second recess may provide a second inlet for the adhesive to be introduced to gaps within the engaging arrangement between surfaces of the second groove and the second protrusion.

In some embodiments, the grooves may include a first groove defined by the lens barrel. The protrusions may include a first protrusion that extends from the lens carrier to at least partially into the first groove. The engaging arrangement may include a shoulder that extends from the lens barrel, e.g., along a plane orthogonal to the optical axis. In some examples, the shoulder may be a portion of the lens barrel that extends to overlap a portion of the lens carrier. In some instances, the shoulder may limit the amount the lens barrel may be inserted into the lens carrier. The shoulder may define a first recess located proximate the first groove. For instance, the first recess may be located above the first groove. The first recess may provide a first inlet for the adhesive to be introduced to gaps within the engaging arrangement between surfaces of the first groove and the first protrusion. In some cases, the grooves may include a second groove defined by the lens barrel. The protrusions may include a second protrusion that extends from the lens carrier to at least partially into the second groove. The second protrusion may be opposite the first protrusion with respect to the lens barrel in some instances. Furthermore, the engaging arrangement may include a second recess defined by the shoulder and located proximate the second groove. For instance, the second recess may be located above the second groove. The second recess may provide a second inlet for the adhesive to be introduced to gaps within the engaging arrangement between surfaces of the second groove and the second protrusion.

Some embodiments include a method of assembling a camera module having an engaging arrangement. The method may include inserting a lens barrel at least partially into a lens carrier such that a protrusion of the engaging arrangement extends from the lens barrel or the lens carrier to at least partially into a first portion of a groove of the engaging arrangement. The groove may be defined by the lens barrel or the lens carrier. In some cases, the method may include rotating the lens barrel about an optical axis defined by one or more lens elements held by the lens barrel, such that the protrusion extends at least partially into a second portion of the groove. Furthermore, the method may include dispensing an adhesive into a recess that is formed on the lens barrel to provide an inlet for the adhesive to be introduced to the engaging arrangement. For instance, the adhesive may be dispensed into the recess such that the adhesive travels to at least partially fill gaps within the engaging arrangement between the lens barrel and the lens carrier.

In some embodiments, dispensing the adhesive into the recess may include filling, with a first portion of the adhesive, a first gap between a first surface of the protrusion and a first surface of the groove. For example, the first gap may be filled with the first portion of the adhesive via capillary effect. In some cases, the first portion of the adhesive may be in compression when force is applied to the lens barrel in at least a first direction. For instance, the first direction may be parallel to the optical axis. Additionally, or alternatively, dispensing the adhesive into the recess may include filling, with a second portion of the adhesive, a second gap between the lens barrel and the groove. For example, the second gap may be filled with the second portion of the adhesive via capillary effect. In some cases, the second portion of the adhesive may be in compression when force is applied to the lens barrel in at least a second direction. For instance, the second direction may be opposite the first direction.

According to some embodiments, the method may include adjusting a position of the lens barrel relative to an image sensor. For instance, the position of the lens barrel may be adjusted to orient the lens elements in an aligned position in which the lens elements are optically aligned with the image sensor. In some implementations, the position of the lens barrel may be adjusted during a time period that occurs after rotating the lens barrel. Furthermore, in some implementations, the method may include curing the adhesive to bond the lens barrel to the lens carrier and to fix the lens elements in the aligned position.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

With respect to some camera modules, once an image sensor is attached to the camera module during manufacturing, the image sensor becomes a static component. Subsequently, during lens attachment, the lens is aligned with the image sensor to provide a sharp image. In some aspects, for example with sensor-shift technologies, both the lens and the image sensor may tilt and have movement along the optical axis (e.g., the z-direction). Because of this, aligning the optical axes to maintain sharp image focus is increasingly complex. In some sensor-shift camera modules, the lens barrel may serve as a stopper (e.g., a z-stopper) preventing or reducing movement along the optical axis and preventing or reducing the risk of the lens detaching and making contact (e.g., hitting) the substrate. A lens flange may prevent an adhesive between the lens barrel and the lens carrier from being dispensed completely around (e.g., 360 degrees) the engagement between the lens barrel and the lens carrier. Without the adhesive being dispensed completely around the engagement between the lens barrel and the lens carrier, delamination of the adhesive may occur causing lens imbalance and lens tilt impacting image quality of a captured image.

In some aspects, an adhesive may not be distributed 360 degrees around the engagement between the lens barrel and the lens carrier. Instead, the adhesive distribution may be concentrated in select clustered areas at bonding sections, partial connection sections, delamination sections, and the adhesive void sections between the lens barrel and the lens carrier. These sections may be separated by gaps. Due to the concentrated area containing the adhesive separated by the gaps, the partial connections sections, the delamination sections, and/or adhesive void sections may form between the lens barrel and the lens carrier causing lens imbalance and lens tilt impacting image quality of a captured image. Based on the distribution of the adhesive and the locations of the partial connection sections, delamination sections, and the adhesive void sections, the lens barrel may tilt towards to a first direction (e.g., an ordinal west W coordinate of north N, south S, east E, and west W ordinal coordinates).

As described herein, an adhesive may not be distributed 360 degrees around the engagement between the lens barrel and the lens carrier. For example, the adhesive distribution may be concentrated in select clustered areas including bonding sections, partial connection sections, unconnected sections, and adhesive void sections in an inner portion between the lens barrel and the lens carrier separated by gaps. Due to the concentrated areas containing the adhesive separated by gaps, the delamination sections on an outer portion of the engagement may form between the lens barrel and the lens carrier causing lens imbalance and lens tilt impacting image quality of a captured image.

There are many different types of problematic couplings. In some aspects, a lens barrel may be coupled to a lens carrier via an adhesive. The coupling may be a partial connection such that the adhesive couples the lens barrel to the lens carrier at a first portion while a space forms between the lens barrel and the lens carrier at a second portion. In some aspects, the coupling engagement may include delamination such that the adhesive couples the lens barrel to the lens carrier at a first portion while at a second portion the lens carrier begins to break off or delaminate from the lens barrel. In some aspects, a lens barrel may be decoupled or unconnected from a lens carrier forming a distance between the lens barrel and the lens carrier. The coupling engagement may include an adhesive breaking apart such that the lens barrel and the lens carrier separate from each other. In some aspects, a lens barrel may be coupled to a lens carrier, via an adhesive. The coupling engagement may include a void such that the void forms within the adhesive. For example, the adhesive may couple the lens barrel to the lens carrier except at the location of the void.

FIG. 1 illustrates a perspective view of an example camera module 100 that includes an example coupling arrangement 102 for attaching a lens barrel 104 to a lens carrier 106 according to some aspects. In some embodiments, the camera module 100 may include one or multiple features, components, and/or functionality of embodiments described herein with reference to FIGS. 2-11.

In some embodiments, the lens barrel 104 may hold one or more lens elements 108 (also referred to herein as the "lens 108") that define an optical axis 110. According to various embodiments, the lens barrel 104 may be a threadless lens barrel. Furthermore, the lens carrier 106 may be a threadless lens carrier. For illustrative purposes, FIG. 1 shows the camera module 100 in an exploded view in which the lens barrel 104 is not attached to the lens carrier 106. However, as discussed in further detail herein, the lens barrel 104 may be attached to and/or coupled with the lens carrier 106 via the coupling arrangement 102. For instance, a drop-and-turn process may be used to interlock the lens barrel 104 with the lens carrier 106 via the coupling arrangement 102. In various embodiments, the coupling arrangement 102 may restrict movement of the lens barrel 104 relative to the lens carrier 106 along at least the optical axis 110 (e.g., in the +z and −z directions). As such, the coupling arrangement 102 may prevent the lens barrel 104 from detaching from the lens carrier 106 under certain circumstances such as a drop event. In some aspects, the lens carrier 106 may retain or include an autofocus (AF) coil 136 of an AF voice motor coil (VCM) for moving the lens 108 (e.g., the lens barrel 104 and the lens carrier 106) in one or more directions along the optical axis 110.

According to some embodiments, the coupling arrangement 102 may include one or more grooves and one or more protrusions. For example, the coupling arrangement 102 may include an upper protrusion 112, one or more lower protrusions 114, and a groove 116. As shown in FIG. 1, the upper protrusion 112 may be circumferentially positioned around (e.g., completely around) an exterior surface 126 of the lens barrel 104. The one or more lower protrusions 114 may also be circumferentially positioned at least partially around the exterior surface 126 of the lens barrel 104 and at another elevation along the direction of the optical axis 110 (negative z-direction) from the upper protrusion 112. In some aspect, one or more lower protrusions 114 may be circumferentially positioned around a portion of the exterior surface 126 of the lens barrel 104 that is less than entire circumference of the lens barrel 104 at the exterior surface 126. For example, the one or more lower protrusions 114 may be separated by one or more spaces 134 on the exterior surface 126 of the lens barrel 104. The one or more spaces 134 may have a width sized to permit at least one coupling protrusion 118 to move through a respective space 134 and into the groove 116 as described herein.

The coupling arrangement 102 may also include one or more coupling protrusions 118. The one or more coupling protrusions 118 are configured for positioning between the upper protrusion 112 and the one or more lower protrusions 114 within the groove 116. As shown in FIG. 1, the one or more coupling protrusions 118 may be positioned on an interior surface 128 of the lens carrier 106. Each of the one or more coupling protrusions 118 may have width sized to pass through the one or more spaces 134 and a height sized for positioning in the groove 116 between the upper protrusion 112 and the one or more lower protrusions 114. The coupling arrangement 102 may restrict movement of the lens barrel relative to the lens carrier along at least the optical axis. For example, the coupling arrangement 102 may restrict movement of the lens barrel in the positive vertical direction and/or restrict movement in the negative vertical direction along at least the optical axis. As described further herein, the interior surface 128 of the lens carrier 106 along with the upper opening 130 and the lower opening 132 may form a central cavity 124 for receiving the lens barrel 104.

The camera module 100 may also include one or more chamfers. As shown in FIG. 1, the lens barrel 104 may include a lens chamfer 120 and the lens carrier 106 may include a lens carrier chamfer 122. When the lens barrel 104 is positioned in a central cavity 124 (e.g., formed by the interior surface 128, the upper opening 130, and the lower opening 132) of the lens carrier 106, a gap may be formed between the exterior surface 126 of the lens barrel 104 and the interior surface 128 of the lens carrier 106. The lens chamfer 120 and the lens carrier chamfer 122 may be positioned at a top opening of the gap and may widen the distance from the exterior surface 126 to the interior surface 128 at the top opening. Thus, the lens chamfer 120 and the lens carrier chamfer 122 may provide a gap so that an adhesive (e.g., epoxy, glue, or the like) may be dispensed 360 degrees around the top opening and into the gap within the coupling arrangement 102. For example, an adhesive may be dispensed completely around a top opening of the gap and permitted to travel through the gap and reside at the coupling arrangement 102. When an adhesive is dispensed 360 degrees around the groove within the coupling arrangement, compression in the positive vertical direction on a first portion of the adhesive between the one or more coupling protrusions and the one or more lower protrusions may reduce the risk of delamination and reduce the risk that the lens barrel may tilt within the lens carrier. Additionally, when an adhesive is dispensed 360 degrees around the groove within the coupling arrangement, compression in the negative vertical direction on a second portion of the adhesive between the one or more coupling protrusions and the upper protrusion may reduce the risk of delamination and reduce the risk that the lens barrel may tilt within the lens carrier.

Figure 2:
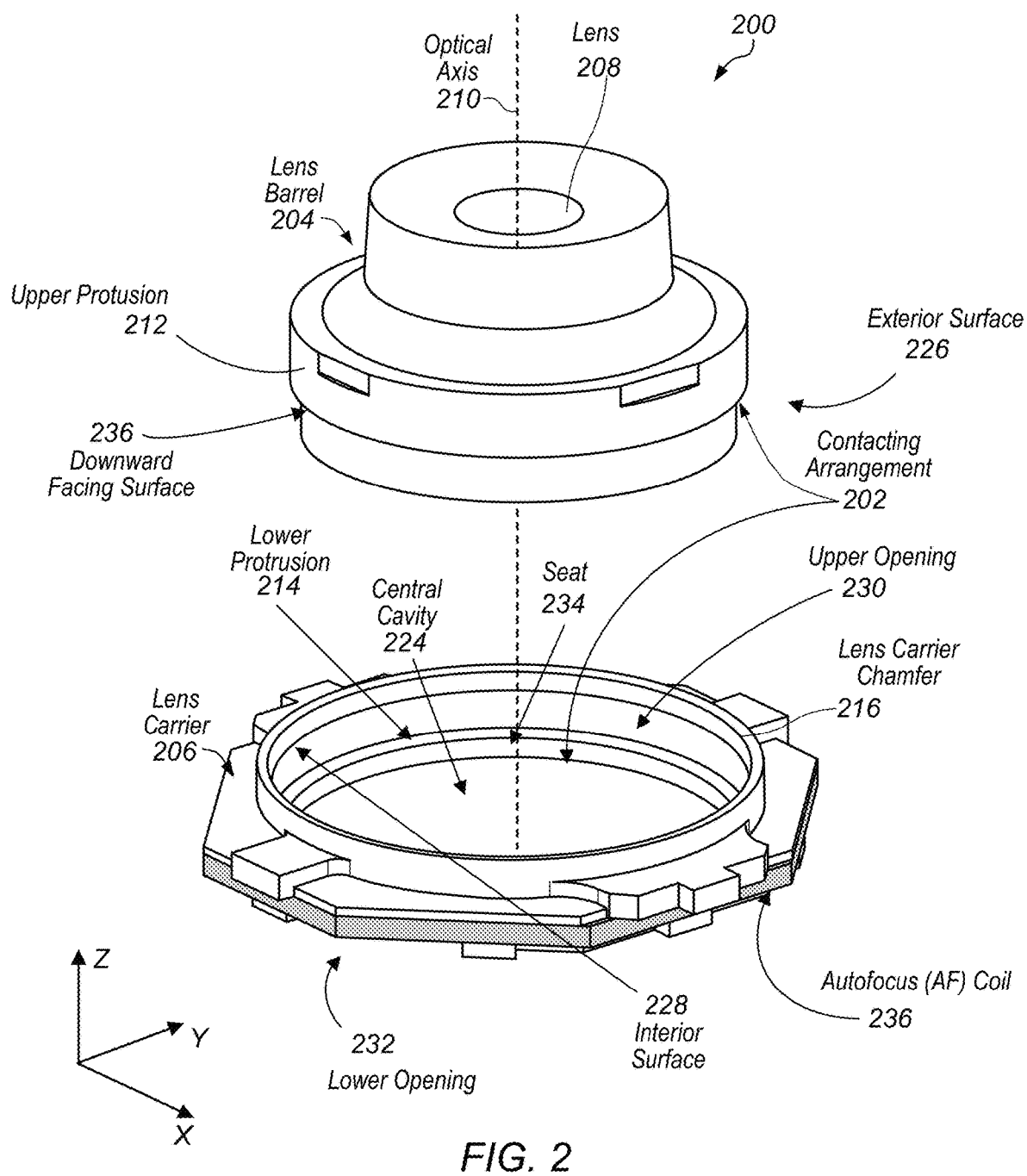
FIG. 2 illustrates a perspective view of an example camera module that includes an example contacting arrangement for attaching a lens barrel to a lens carrier according to some aspects.

FIG. 2 illustrates a perspective view of an example camera module 200 that includes an example contacting arrangement 202 for attaching a lens barrel 204 to a lens carrier 206 according to some aspects. In some embodiments, the camera module 200 may include one or multiple features, components, and/or functionality of embodiments described herein with reference to FIGS. 1 and 3-11.

In some embodiments, the lens barrel 204 may hold one or more lens elements 208 (also referred to herein as the "lens 208") that define an optical axis 210. According to various embodiments, the lens barrel 204 may be a threadless lens barrel. Furthermore, the lens carrier 206 may be a threadless lens carrier. For illustrative purposes, FIG. 2 shows the camera module 200 in an exploded view in which the lens barrel 204 is not attached to the lens carrier 206. However, as discussed in further detail herein, the lens barrel 204 may be coupled to the lens carrier 206 via the contacting arrangement 202. For instance, the lens barrel 204 may be inserted into the central cavity 224 of the lens carrier 206 through an upper opening 230. The lens barrel 204 may be moved though the central cavity 224 until the upper protrusion 212 with the lens carrier 206 engages with a seat formed by the lower protrusion 214 of the lens carrier 206. In various embodiments, the contacting arrangement 202 may restrict movement of the lens barrel 204 relative to the lens carrier 206 along at least the optical axis 210 (e.g., in the +z and −z directions). As such, the contacting arrangement 202 may prevent the lens barrel 204 from detaching from the lens carrier 206, for example, through the lower opening 232, under certain circumstances such as a drop event. In some aspects, the lens carrier 206 may retain or include an autofocus (AF) coil 236 of an AF voice motor coil (VCM) for moving the lens 208 (e.g., the lens barrel 204 and the lens carrier 206) in one or more directions along the optical axis 210.

According to some embodiments, the contacting arrangement 202 may include one or more groves and one or more protrusions. For example, the contacting arrangement 202 may include an upper protrusion 212 and one or more lower protrusion 214. As shown in FIG. 2, the upper protrusion 212 may be circumferentially positioned around (e.g., completely around) an exterior surface 226 of the lens barrel 204. The one or more lower protrusion 214 may also be circumferentially positioned at least partially around the interior surface 228 of the lens carrier 206. In some aspect, one or more lower protrusions 214 may be circumferentially positioned around a portion of the interior surface 228 of the lens carrier 206 that is less than entire circumference of the interior surface 228 of the lens carrier 206. For example, the one or more lower protrusions 214 may be separated by one or more spaces on the interior surface 228 of the lens carrier 206.

In some aspects, the one or more lower protrusions 214 may include a seat 234 for receiving a downward facing surface 236 of the upper protrusion 212. The seat 234 may include a surface that is not parallel with the optical axis 210 and that is not orthogonal to the optical axis 210. The downward facing surface 236 may be a surface that is configured to be received by the surface of the seat 234. In some instances, the seat 234 may form a z-shape with the lower protrusion 214 and the interior surface 228. Additionally, or alternatively, the downward facing surface 236 may form a z-shape with the upper protrusion 212 and the exterior surface 226. For example, when the seat 234 is adjacent (e.g., engaged with, separated a distance from, separated using an adhesive from) the downward facing surface 236, the seat 234, the downward facing surface 236, and/or a gap or channel formed between the surface 236 and the seat 234 may have a z-shaped relative to the optical axis 210. The z-shape may allow adhesive to travel via gravity and/or the capillary effect to at least partially fill gaps within the contacting arrangement 202.

The contacting arrangement 202 may restrict movement of the lens barrel relative to the lens carrier in at least one direction along the optical axis. For example, the contacting arrangement 202 may restrict movement of the lens barrel in the negative vertical direction along at least the optical axis. As described further herein, the interior surface 228 of the lens carrier 206 along with the upper opening 230 and the lower opening 232 may form a central cavity 224 for receiving the lens barrel 204.

The camera module 200 may also include one or more chamfers. As shown in FIG. 2, the lens carrier 206 may include a lens carrier chamfer 216. When the lens barrel 204 is positioned in a central cavity 224 (e.g., formed by the interior surface 228, the upper opening 230, and the lower opening 232) of the lens carrier 206, a gap may be formed between the exterior surface 226 of the lens barrel 204 and the interior surface 228 of the lens carrier 206. The lens carrier chamfer 216 may be positioned at a top opening of the gap and may widen the distance from the exterior surface 226 to the interior surface 228 at the top opening. Thus, the lens carrier chamfer 216 may provide a gap so that an adhesive (e.g., epoxy, glue, or the like) may be dispensed 360 degrees around the top opening and into the gap within the contacting arrangement 202. For example, an adhesive may be dispensed completely around a top opening of the gap and permitted to travel through the gap and reside at the contacting arrangement 202. When an adhesive is dispensed 360 degrees around the groove within the contacting arrangement 202, compression in the negative vertical direction on a portion of the adhesive between the seat 234 and the downward facing surface 236 may reduce the risk of delamination and reduce the risk that the lens barrel may tilt within the lens carrier.

Figure 3:
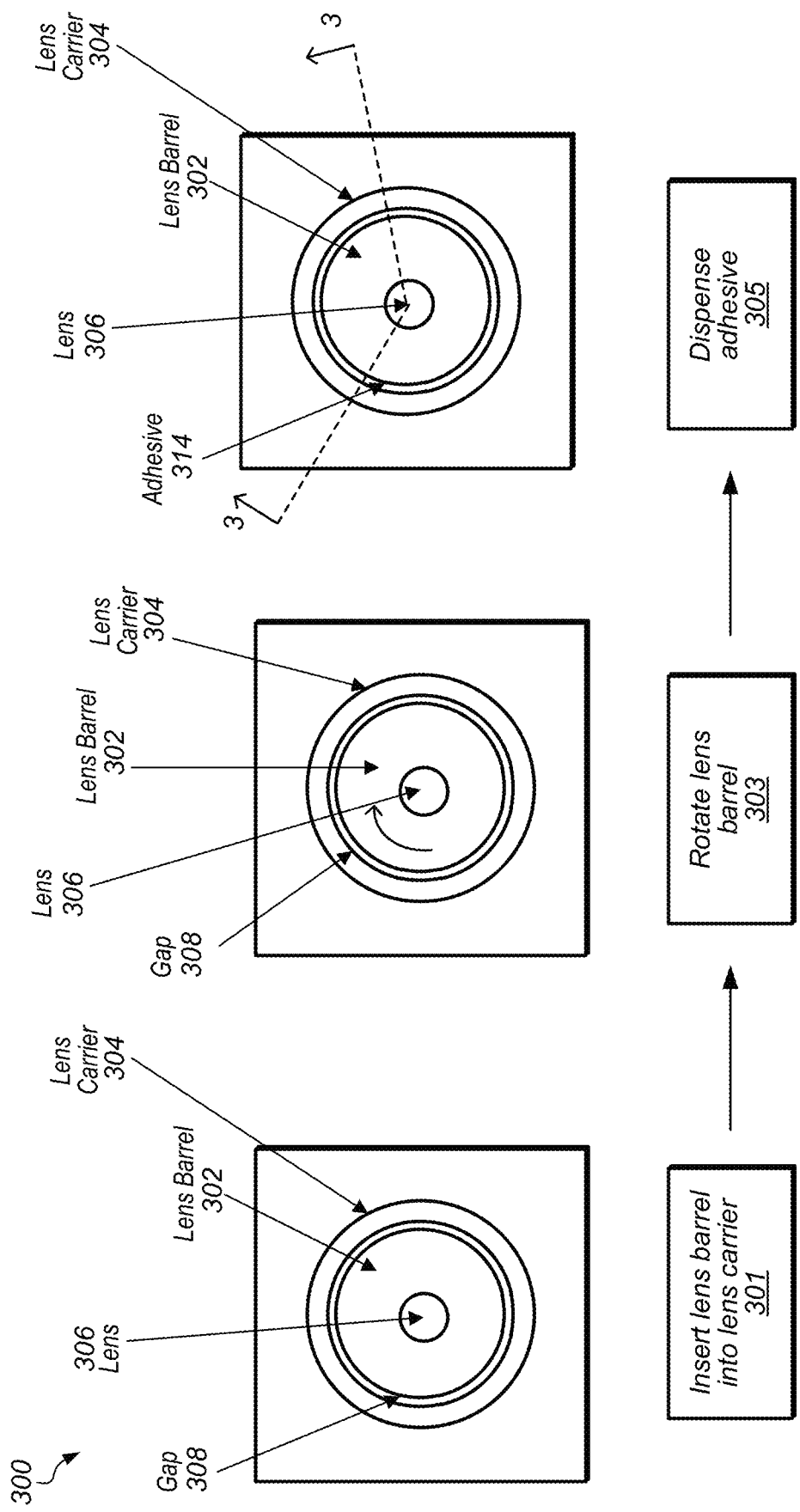
FIG. 3 illustrates a process flow diagram of an example process for attaching a lens barrel to a lens carrier via a coupling arrangement according to some aspects.

FIG. 3 illustrates a process flow diagram of an example process 300 for attaching a lens barrel to a lens carrier via a coupling arrangement according to some aspects. For clarity, the following discussion with respect to the process 300 of FIG. 3 will also refer to elements of FIGS. 1 and 2. It should be understood, however, that in some embodiments the process 300 may include one or multiple features, components, and/or functionality of embodiments described herein with reference to FIGS. 1, 2, and 4-11.

At 301, the process 300 may include inserting the lens barrel 302 at least partially into the lens carrier 304. For instance, the lens barrel 302 may be positioned above the lens carrier 304 and inserted into the lens carrier 304 along a path that substantially follows an axis, e.g., the optical axis 110. When inserting the lens barrel 302 into the lens carrier 304, the one or more lower protrusions 114 may be oriented such that each respective space 134 is aligned with a respective coupling protrusion 118. The lens barrel 302 may be moved through the upper opening 130 and into the central cavity 124 towards to the lower opening 132. The lens barrel 302 moves through the central cavity 124 towards to the lower opening 132 until the one or more coupling protrusions 118 engage the upper protrusion 112 so that the one or more coupling protrusions 118 are resting within the groove 116. As another example, the lens barrel 302 may be positioned above the lens carrier 304 and inserted into the lens carrier 304 along a path that substantially follows an axis, e.g., the optical axis 210. When inserting the lens barrel 302 into the lens carrier 304, the lens barrel 302 may be inserted into the upper opening 230 and through the central cavity 224 of the lens carrier 206 towards the lower opening 232 until the downward facing surface 236 of the upper protrusions 212 engages with the seat 234 of the lower protrusion 214.

At 303, the process 300 may include rotating the lens barrel 302. For example, the lens barrel 302 may be rotated, relative to the lens carrier 304, clockwise or counterclockwise about the optical axis 110 or the lens 306. In various embodiments, each of the one or more coupling protrusions 118 may engage the upper protrusion 112 and thus are resting within the groove 116. According to some embodiments, the groove 116 may be an L-shaped groove. The L-shaped groove may extend circumferentially along a portion of exterior surface 126 of the lens barrel 104 in some embodiments. The lens barrel 302 may be rotated, relative to the lens carrier 304, clockwise or counterclockwise about the optical axis 110 so that at least a portion of the coupling protrusion(s) 118 within the groove 116 is not aligned with the respective space 134 and engages with a lower protrusion 114 when the lens barrel 104 is moved in the upward z-direction in addition to engaging the upper protrusion 112 when the lens barrel 104 is moved in the downward z-direction. As another example, the lens barrel 302 may be rotated, relative to the lens carrier 304, clockwise or counterclockwise about the optical axis 210 or the lens 306.

At 305, the process 300 may include dispensing adhesive into the coupling arrangement 102. For instance, the adhesive 314 may be dispensed 360 degrees around gap 308 into the coupling arrangement 102. In some examples, the adhesive 314 may be dispensed into the gap 308 such that the adhesive travels to at least partially fill the gap 308 within the coupling arrangement 102 between the lens barrel 302 and the lens carrier 304. In some instances, the gap 308 may be widened using one or more chamfers positioned at the opening of the gap 308 as described herein. As another example, the adhesive 314 may be dispensed 360 degrees around the gap 308 into the coupling arrangement 202 and at least partially through the gap 308. In some examples, the adhesive 314 may be dispensed into the gap 308 such that the adhesive travels to at least partially fill the gap 308 within the coupling arrangement 202 between the lens barrel 302 and the lens carrier 304. In some instances, the gap 308 may be widened using one or more chamfers positioned at the opening of the gap 308 as described herein.

Figure 4:
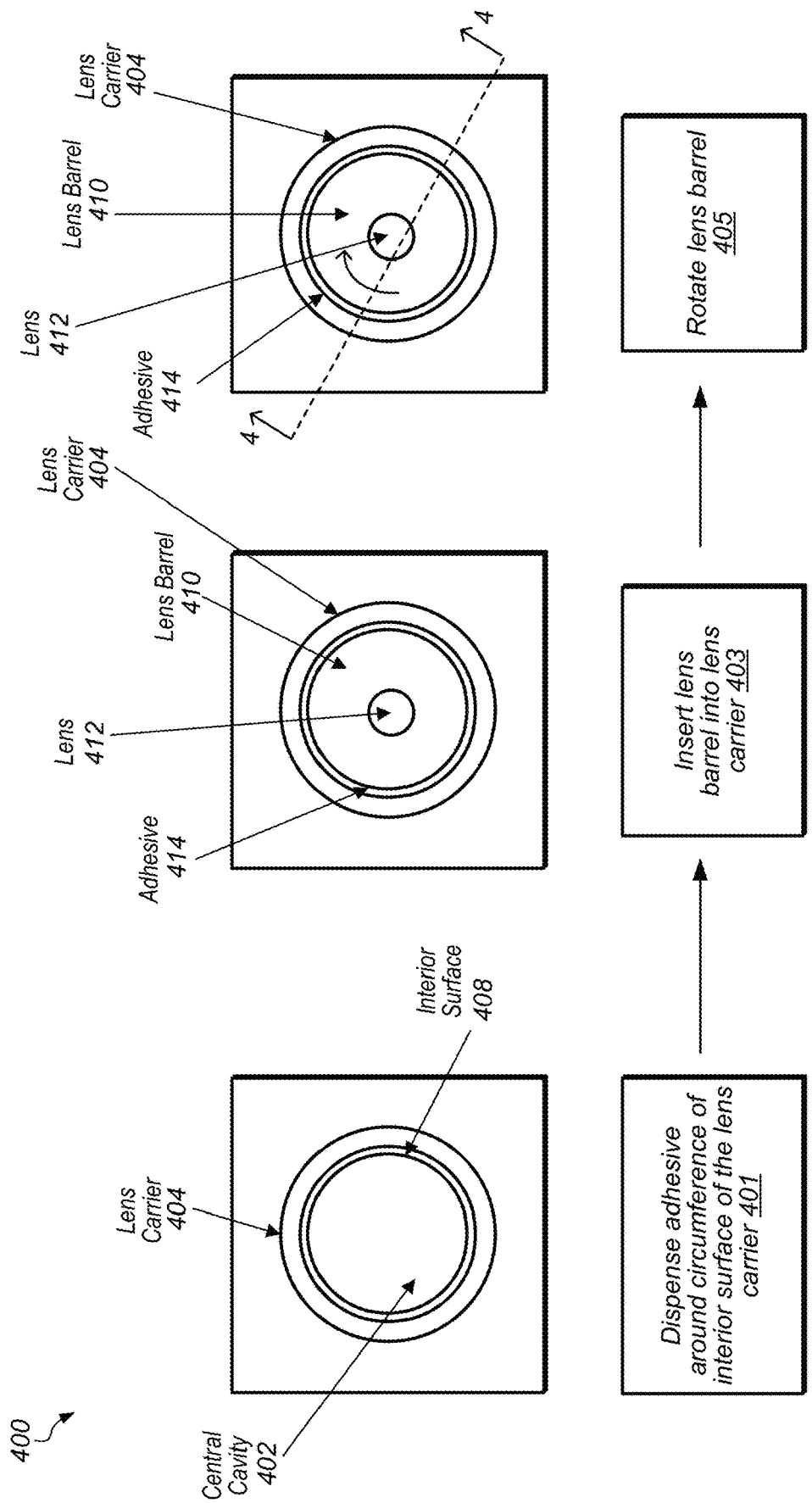
FIG. 4 illustrates a process flow diagram of an example process for attaching a lens barrel to a lens carrier via a contacting arrangement according to some aspects.

FIG. 4 illustrates a process flow diagram of an example process 400 for attaching a lens barrel to a lens carrier via a contacting arrangement according to some aspects. For clarity, the following discussion with respect to the process 400 of FIG. 4 will also refer to elements of FIGS. 1 and 2. It should be understood, however, that in some embodiments the process 400 may include one or multiple features, components, and/or functionality of embodiments described herein with reference to FIGS. 1-3 and 5-11.

At 401, the process 400 may include dispensing adhesive around the interior surface of the lens carrier. For instance, an adhesive may be dispensed 360 degrees around the interior surface 404 of the lens carrier 404 at an elevation of the coupling protrusion 118. In some aspects, the adhesive may be dispensed 360 degrees around the coupling arrangement 102 including one or more coupling protrusions 118. As another example, an adhesive may be dispensed 360 degrees around the interior surface 408 of the lens carrier 404 at an elevation of the lower protrusion 214 and/or the seat 234 of the lower protrusion 214. In some aspects, an adhesive may be dispensed around the interior surface 408 of the lens carrier 404 before a lens barrel is inserted into the central cavity 402 of the lens carrier 404.

At 403, the process 400 may include inserting the lens barrel 410 at least partially into the lens carrier 404. For instance, the lens barrel 410 may be positioned above the lens carrier 404 and inserted into the lens carrier 304 along a path that substantially follows an axis, e.g., the optical axis 110, such as through the lens 412. When inserting the lens barrel 410 into the lens carrier 404, the one or more lower protrusions 114 may be oriented such that each respective space 134 is aligned with a respective coupling protrusion 118. The lens barrel 410 may be moved through the upper opening 130 and into the central cavity 124 towards to the lower opening 132. The lens barrel 410 moves through the central cavity 124 towards to the lower opening 132 until the one or more coupling protrusions 118 engage the upper protrusion 112 so that the one or more coupling protrusions 118 are resting within the groove 116. The adhesive 414 dispensed around the interior surface 408 of the lens carrier 404 may engage with the exterior surface 126 of the lens carrier as the lens carrier 404 moves through the central cavity 124 towards to the lower opening 132 and to the one or more coupling protrusions 118. In some aspects, when the lens barrel 410 is inserted into the lens carrier 404, the adhesive 414, dispensed on the interior surface 228 of the lens carrier 404, for example, including at least one of the coupling protrusions 118, engages at least one of the lower protrusion 114 of the exterior surface 126 of the lens barrel 410, the upper protrusion 112 of the exterior surface 126 of the lens barrel 410, or the groove 116 of the exterior surface 126 of the lens barrel 410.

As another example, the lens barrel 410 may be positioned above the lens carrier 404 and inserted into the lens carrier 404 along a path that substantially follows an axis, e.g., the optical axis 210, such as through the lens 412. When inserting the lens barrel 410 into the lens carrier 404, the lens barrel 410 may be inserted into the upper opening 230 and through the central cavity 224 of the lens carrier 206 towards the lower opening 232 until the downward facing surface 236 of the upper protrusions 212 engages with the seat 234 of the lower protrusion 214. The adhesive 414 dispensed around the interior surface 408 of the lens carrier 404 may engage with the exterior surface 226 of the lens carrier 404 as the lens carrier 404 moves through the central cavity 224 towards to the seat 234 of the lower protrusion 214. In some aspects, when the lens barrel 410 is inserted into the lens carrier 404, the adhesive 414 dispensed on the contacting arrangement 202 including at least one of the seat 234 or the lower protrusion 214 may engage at least one of the downward facing surface 236 of the upper protrusion 212 or the seat 234 of the lower protrusion 214.

At 405, the process 400 may include rotating the lens barrel 410. For example, the lens barrel 410 may be rotated, relative to the lens carrier 404, clockwise or counterclockwise about the optical axis 110 or the lens 412. In various embodiments, each of the one or more coupling protrusions 118 may engage the upper protrusion 112 and thus are resting within the groove 116. According to some embodiments, the groove 116 may be an L-shaped groove. The L-shaped groove may extend circumferentially along a portion of exterior surface 126 of the lens barrel 410 in some embodiments. The lens barrel 410 may be rotated, relative to the lens carrier 404, clockwise or counterclockwise about the optical axis 110 so that at least a portion of the coupling protrusion(s) 118 within the groove 116 is not aligned with the respective space 134 and engages with a lower protrusion 114 when the lens barrel 410 is moved in the upward z-direction in addition to engaging the upper protrusion 112 when the lens barrel 410 is moved in the downward z-direction. In addition, by rotating the lens barrel 410, the adhesive 414 may be more evenly distributed across the interlock arrangement 102 between the coupling protrusion(s) 118 of the interior surface 128 of the lens carrier 404 and at least one of the upper protrusion(s) 112 of the exterior surface 126 of the lens barrel 410, the groove 116 of the exterior surface 126 of the lens barrel 410, or the lower protrusion(s) 114 of the exterior surface 126 of the lens barrel 410. As another example, the lens barrel 302 may be rotated, relative to the lens carrier 304, clockwise or counterclockwise about the optical axis 210 or the lens 412. By rotating the lens barrel 410, the adhesive 414 may be more evenly distributed across the contacting arrangement 202 between the seat 234 and/or the lower protrusion(s) 218 of the interior surface 228 of the lens carrier 404 and at least one of the downward facing surface(s) 236 and/or the upper protrusion(s) 212 of the exterior surface 226 of the lens barrel 410.

Figure 5:
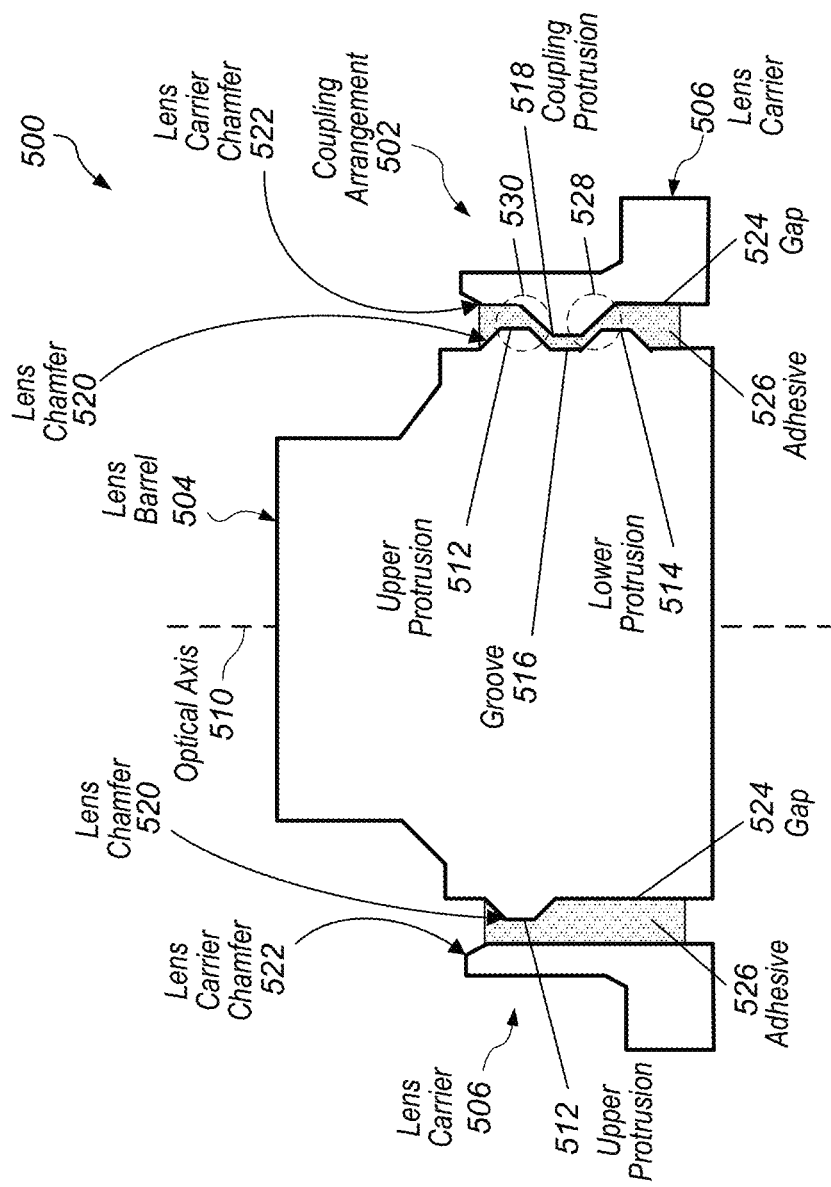
FIG. 5 illustrates a cross-sectional side view of an example camera module that includes an example coupling arrangement according to some aspects.

FIG. 5 illustrates two half cross-sectional side views of an example camera module 500 that includes an example coupling arrangement according to some aspects. For example, the two half cross-sectional side views of FIG. 5 may correspond to partial or half cross-sections taken along section line 3-3 shown in FIG. 3. In some embodiments the camera module 500 may include one or multiple features, components, and/or functionality of embodiments described herein with reference to FIGS. 1-4 and 6-11. In some aspects, the example camera module 500 may include one or more same or similar features as the example camera module 100 illustrated in FIG. 1.

In some embodiments, the lens barrel 504 may hold one or more lens elements such as a lens, as described herein, that define an optical axis 510. According to various embodiments, the lens barrel 504 may be a threadless lens barrel. Furthermore, the lens carrier 506 may be a threadless lens carrier. As shown in FIG. 5, the lens barrel 504 may be attached to and/or coupled with the lens carrier 506 via the coupling arrangement 502. For instance, a drop-and-turn process may be used to couple the lens barrel 504 with the lens carrier 506 via the coupling arrangement 502. In various embodiments, the coupling arrangement 502 may restrict movement of the lens barrel 504 relative to the lens carrier 506 along at least the optical axis 510 (e.g., in the +z and −z directions). As such, the coupling arrangement 502 may prevent the lens barrel 504 from detaching from the lens carrier 506 under certain circumstances such as a drop event.

According to some embodiments, the coupling arrangement 502 may include one or more grooves and one or more protrusions. For example, the coupling arrangement 502 may include an upper protrusion 512, one or more lower protrusions 514, and a groove 516. The upper protrusion 512 may be circumferentially positioned around (e.g., completely around) an exterior surface of the lens barrel 504. The one or more lower protrusions 514 may also be circumferentially positioned at least partially around the exterior surface of the lens barrel 504 and at another elevation along the direction of the optical axis 510 (negative z-direction) from the upper protrusion 512. In some aspect, one or more lower protrusions 514 may be circumferentially positioned around a portion of the exterior surface of the lens barrel 504 that is less than entire circumference of the lens barrel 504 at the exterior surface. For example, the one or more lower protrusions 514 may be separated by one or more spaces on the exterior surface of the lens barrel 504. The one or more spaces may have a width sized to permit at least one coupling protrusion 518 to move through a respective space and into the groove 516.

The coupling arrangement 502 may also include one or more coupling protrusions 518. The one or more coupling protrusions 518 are configured for positioning between the upper protrusion 512 and the one or more lower protrusions 514 within the groove 516. As shown in FIG. 5, the one or more coupling protrusions 518 may be positioned on an interior surface of the lens carrier 506. Each of the one or more coupling protrusions 518 may have width sized to pass through the one or more spaces and a height sized for positioning in the groove 516 between the upper protrusion 512 and the one or more lower protrusions 514. In a coupled state, the coupling arrangement 502 may restrict movement of the lens barrel 504 relative to the lens carrier 506 in at least one direction along the optical axis 510. For example, in the coupled state, the coupling arrangement 502 may restrict movement of the lens barrel 504 in the positive vertical direction and/or restrict movement of the lens barrel 504 in the negative vertical direction along at least the optical axis 510. For example, as shown in FIG. 5, the coupling arrangement 502 may be in a coupled state such that the coupling protrusion 516 is positioned within the groove 516 between the upper protrusion 512 and the lower protrusion 514 and restricting movement of the lens barrel 504 in the positive and/or the negative direction along the optical axis 510. In addition, surfaces of the coupling arrangement 502 holding the lens barrel 504 in a coupled state relative to the lens carrier 506 such as the surfaces of the lower protrusion 514 and the coupling protrusion 518 at the first location 528 and/or the surfaces of the upper protrusion 512 and the coupling protrusion 518 at the second location 530 may not be parallel with the optical axis 510 and may not be orthogonal to the optical axis 510 to allow the adhesive 526 to travel from the top opening of the gap 524 to at least partially fill the gap 524 via capillary effect.

The camera module 500 may also include one or more chamfers. As shown in FIG. 5, the lens barrel 504 may include a lens chamfer 520 and the lens carrier 506 may include a lens carrier chamfer 522. With the lens barrel 504 positioned in a central cavity (e.g., formed by the interior surface 128, the upper opening 130, and the lower opening 132 illustrated in FIG. 1) of the lens carrier 506, a gap 524 may be formed between the exterior surface of the lens barrel 504 and the interior surface of the lens carrier 506. The lens chamfer 520 and the lens carrier chamfer 522 may be positioned at a top opening of the gap 524 and may widen the distance from the exterior surface of the lens barrel 504 to the interior surface 128 of the lens carrier 506 at the top opening. Thus, the lens chamfer 520 and the lens carrier chamfer 522 may provide a larger opening into the gap 524 so that the adhesive 526 (e.g., epoxy, glue, or the like) may be dispensed 360 degrees around the top opening and into the gap 524 within the coupling arrangement 502. For example, the adhesive 526 may be dispensed completely around a top opening of the gap 524 and permitted to travel through the gap 524 and reside at the coupling arrangement 502.

In some instances, one or more forces may be applied to the lens barrel 504 in one or more directions parallel to the optical axis 510. In the case of a drop event, for example, opposite forces may be applied to the lens barrel 504 and the lens carrier 506 upon impact. In some other camera designs, an adhesive used to bond a lens barrel to a lens carrier may be primarily in tension and/or shear, not compression, when forces are applied to the lens barrel in directions parallel to the optical axis. As such, the lens barrel in those other camera designs may tend to detach from the lens carrier as a result of a drop event and/or another situation in which forces are applied to the lens barrel. In contrast, in various embodiments described herein one or more portions of the adhesive 526 may be in compression when force is applied to the lens barrel 504, e.g., in directions parallel to the optical axis 510 (defined by one or more lens elements held by the lens barrel 504). Accordingly, embodiments of the coupling arrangement described herein may be more likely to prevent the lens barrel 504 from detaching from the lens carrier 506 than the other camera designs (in which the adhesive is primarily in tension and/or shear) in some instances. For example, when the adhesive 526 is dispensed 360 degrees around the groove 516 within the coupling arrangement 502, as shown in FIG. 5, compression of the lens barrel 504, via the lower protrusion 514, on the adhesive 526 at the first location 528 in the positive vertical direction (e.g., +z direction) parallel to the optical axis 510 on the lens carrier 506, via the one or more coupling protrusions 518, may reduce the risk of delamination of the adhesive 526 and may reduce the risk that the lens barrel 504 may tilt within the lens carrier 506. Additionally, when the adhesive 526 is dispensed 360 degrees around the groove 516 within the coupling arrangement 502, as shown in FIG. 5, compression of the lens barrel 504, via the upper protrusions 512, on the adhesive 526 at the second location 530 in the negative vertical direction (e.g., −z direction) parallel to the optical axis 510 on the lens carrier 506, via the one or more coupling protrusions 518, may also reduce the risk of delamination of the adhesive 526 and may reduce the risk that the lens barrel 504 may tilt within the lens carrier 506.

Figure 6:
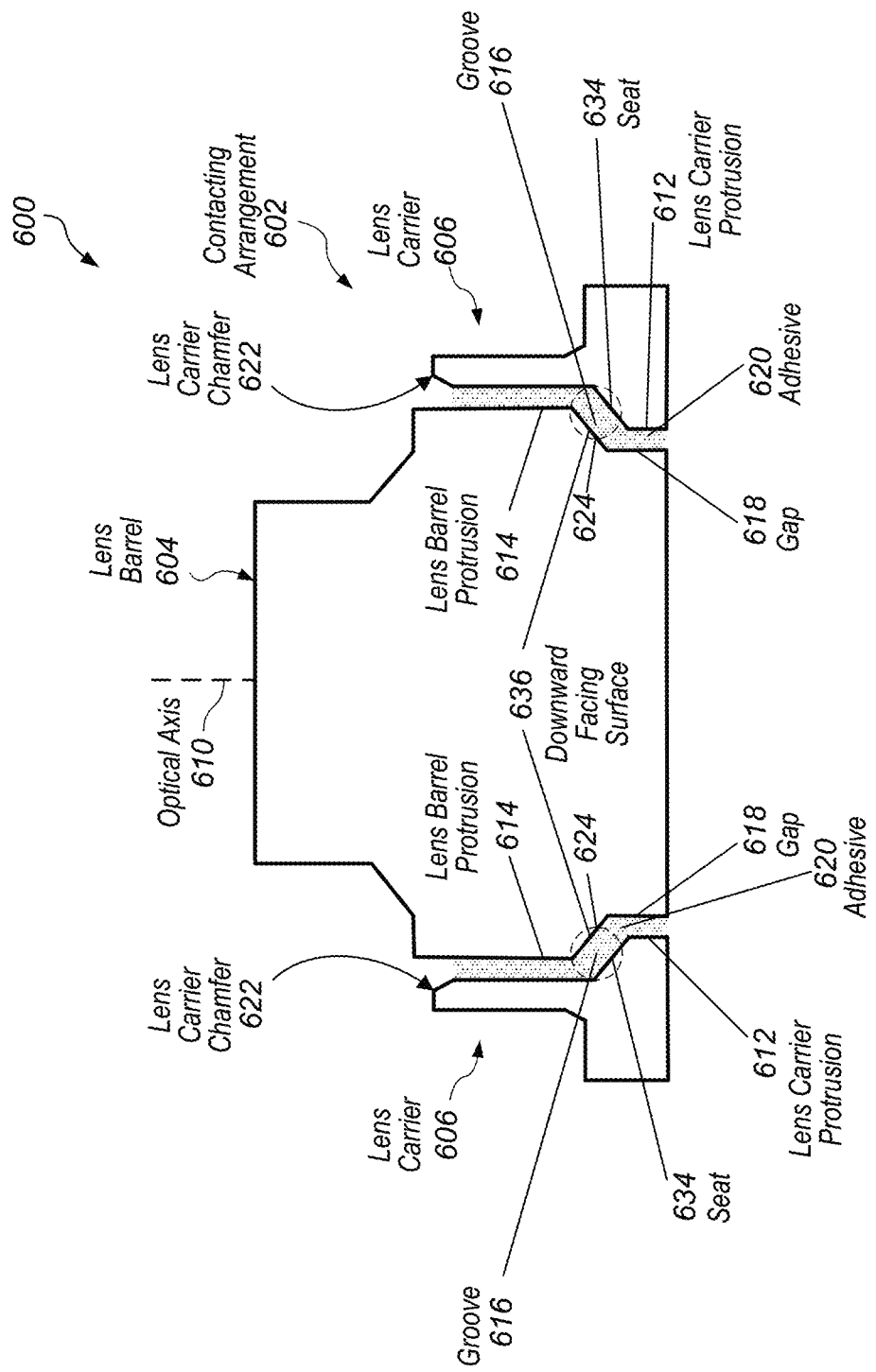
FIG. 6 illustrates a cross-sectional side view of an example camera module that includes an example contacting arrangement according to some aspects.

FIG. 6 illustrates a cross-sectional side view of an example camera module 600 that includes an example contacting arrangement according to some aspects. For example, the cross-sectional side view of FIG. 6 may correspond to a cross-section taken along section line 4-4 shown in FIG. 4. In some embodiments the camera module 600 may include one or multiple features, components, and/or functionality of embodiments described herein with reference to FIGS. 1-5 and 7-11. In some aspects, the example camera module 600 may include one or more same or similar features as the example camera module 200 illustrated in FIG. 2.

In some embodiments, the lens barrel 604 may hold one or more lens elements (also referred to herein as the "lens") that define an optical axis 610. According to various embodiments, the lens barrel 604 may be a threadless lens barrel. Furthermore, the lens carrier 606 may be a threadless lens carrier. As shown in FIG. 6, the lens barrel 604 is coupled to the lens carrier 606 via the contacting arrangement 602. For instance, the lens barrel 604 may have been inserted into the central cavity of the lens carrier 606 through an upper opening. The lens barrel 604 may have moved though the central cavity until the lens barrel protrusion 614 of the lens barrel 604 engages with a seat formed by the lens carrier protrusion 612 of the lens carrier 606. In various embodiments, the contacting arrangement 602 may restrict movement of the lens barrel 604 relative to the lens carrier 606 along at least the optical axis 610 (e.g., in the +z and −z directions). As such, the contacting arrangement 602 may prevent the lens barrel 604 from detaching from the lens carrier 606, for example under certain circumstances such as a drop event.

According to some embodiments, the contacting arrangement 602 may include one or more groves and one or more protrusions. For example, as described herein, the contacting arrangement 602 may include a lens barrel protrusion 614 and one or more lens carrier protrusions 612. The lens barrel protrusion 614 may be circumferentially positioned around (e.g., completely around) an exterior surface of the lens barrel 604. The one or more lens carrier protrusions 612 may also be circumferentially positioned at least partially around the interior surface of the lens carrier 606. In some aspects, one or more lens carrier protrusions 612 may be circumferentially positioned around a portion of the interior surface of the lens carrier 606 that is less than entire circumference of the interior surface of the lens carrier 606. For example, the one or more lens carrier protrusions 612 may be separated by one or more spaces on the interior surface of the lens carrier 606.

In some aspects, the one or more lens carrier protrusions 612 may include a seat 634 for receiving a downward facing surface 636 of the lens barrel protrusion 614. The seat 634 may include a surface that is not parallel with the optical axis 610 and that is not orthogonal to the optical axis 610. The downward facing surface 636 may be a surface that is configured to be received by the seat 634. In some instances, the seat 634 may form a z-shape with a respective lens carrier protrusion 612 and the interior surface of the lens carrier 606. Additionally, or alternatively, the downward facing surface 636 may form a z-shape with a respective lens barrel protrusion 614 and the exterior surface of the lens barrel 604. For example, when the seat 634 is adjacent (e.g., engaged with, separated a distance from, separated using an adhesive from) the downward facing surface 636, the seat 634, the downward facing surface 636, and/or a gap 618 (or channel) formed between the downward facing surface 636 and the seat 634 may have a z-shaped relative to the optical axis 610. The z-shape may allow the adhesive 620 to travel via gravity and/or the capillary effect to at least partially fill gap 618 within the contacting arrangement 602 when the adhesive 620 is dispensed into the gap 618.

The contacting arrangement 602 may restrict movement of the lens barrel 604 relative to the lens carrier 606 in at least one direction along the optical axis 610. For example, the contacting arrangement 602 may restrict movement of the lens barrel 604 in the negative vertical direction (e.g., –z direction) along at least the optical axis 610. The camera module 600 may also include one or more chamfers. As shown in FIG. 6, the lens carrier 606 may include a lens carrier chamfer 622. As described herein, when the lens barrel 604 is positioned in a central cavity, a gap 618 may be formed between the exterior surface of the lens barrel 604 and the interior surface of the lens carrier 606. The lens carrier chamfer 622 may be positioned at a top opening of the gap 618 and may widen the distance from the exterior surface of the lens barrel 604 to the interior surface of the lens carrier 606 at the top opening of the gap 618. Thus, the lens carrier chamfer 622 may provide a greater distance across the gap 618 so that the adhesive 620 (e.g., epoxy, glue, or the like) may be dispensed 360 degrees around the top opening and into the gap 618 within the contacting arrangement 602. For example, the adhesive 618 may have been dispensed completely around the top opening of the gap 618, permitted to travel through the gap 618, and reside at the contacting arrangement 602.

In some instances, one or more forces may be applied to the lens barrel 604 in one or more directions parallel to the optical axis 610. In the case of a drop event, for example, opposite forces may be applied to the lens barrel 604 and the lens carrier 606 upon impact. In some other camera designs, an adhesive used to bond a lens barrel to a lens carrier may be primarily in tension and/or shear, not compression, when forces are applied to the lens barrel in directions parallel to the optical axis. As such, the lens barrel in those other camera designs may tend to detach from the lens carrier as a result of a drop event and/or another situation in which forces are applied to the lens barrel. In contrast, in various embodiments described herein one or more portions of the adhesive 620 may be in compression when force is applied to the lens barrel 604, e.g., in directions parallel to the optical axis 610 (defined by one or more lens elements held by the lens barrel 604). Accordingly, embodiments of the contacting arrangement 602 described herein may be more likely to prevent the lens barrel 604 from detaching from the lens carrier 606 than the other camera designs (in which the adhesive is primarily in tension and/or shear) in some instances. For example, when the adhesive 620 is dispensed 360 degrees around the groove 616 within the contacting arrangement 602, as shown in FIG. 6, compression of the lens barrel 604, via the lens barrel protrusion 614, on the adhesive 620 at the first location 624 in the negative vertical direction (e.g., –z direction) parallel to the optical axis 610 on the lens carrier 606, via the one or more lens carrier protrusions 612, may reduce the risk of delamination of the adhesive 620 and may reduce the risk that the lens barrel 604 may tilt within the lens carrier 606. For example, when the adhesive 620 is dispensed 360 degrees around the groove 616 within the contacting arrangement 602, compression of the lens barrel 604 in the negative vertical direction (e.g., –z direction) on a portion of the adhesive between the seat 634 and the downward facing surface 636 may reduce the risk of delamination and reduce the risk that the lens barrel 604 may tilt within the lens carrier 606.

Figure 7:
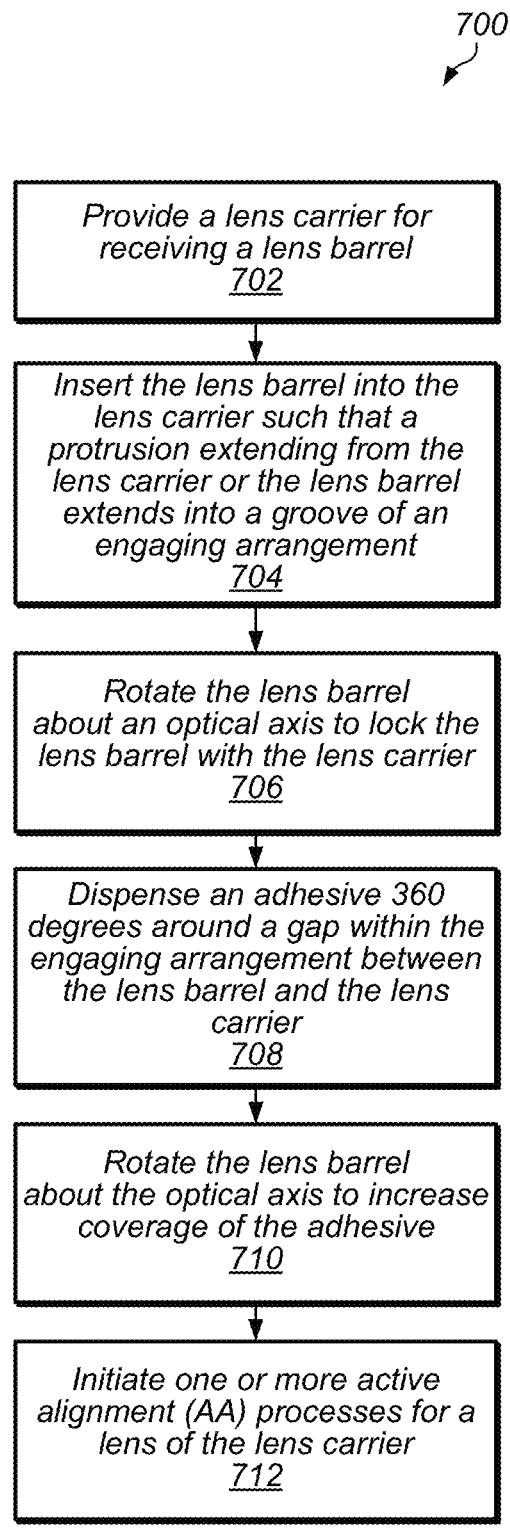
FIG. 7 is a flowchart of an example method of assembling a camera module having an engaging arrangement according to some aspects.

FIG. 7 illustrates a process flow diagram of an example process 700 for attaching a lens barrel to a lens carrier via an engaging arrangement according to some aspects. For clarity, the following discussion with respect to the process 700 of FIG. 7 will also refer to elements of FIGS. 1 and 1. For example, the engaging arrangement may include one of the coupling arrangement described herein or the contacting arrangement described herein. It should be understood, however, that in some embodiments the process 700 may include one or multiple features, components, and/or functionality of embodiments described herein with reference to FIGS. 1-6 and 10-11.

At 702, the process 700 may include providing a lens carrier for receiving a lens barrel. In some instances, the lens carrier may be the lens carrier 106 illustrated in FIG. 1 and the lens barrel may be the lens barrel 104 illustrated in FIG. 1. Additionally, or alternatively, the lens carrier may be the lens carrier 206 illustrated in FIG. 2 and the lens barrel may be the lens barrel 204 illustrated in FIG. 2. In some aspects, the lens carrier may be the lens carrier 506 illustrated in FIG. 5 and the lens barrel may be the lens barrel 504 illustrated in FIG. 5. Additionally, or alternatively, the lens carrier may be the lens carrier 606 illustrated in FIG. 6 and the lens barrel may be the lens barrel 604 illustrated in FIG. 6.

At 704, the process 700 may include inserting the lens barrel into the lens carrier such that a protrusion extending from the lens carrier and/or the lens barrel extends into a groove of a coupling arrangement. For example, the lens barrel may be positioned above the lens carrier and inserted into the lens carrier along a path that substantially follows an axis, e.g., the optical axis. When inserting the lens barrel into the lens carrier, the one or more lower protrusions may be oriented such that each respective space is aligned with a respective coupling protrusion. The lens barrel may be moved through the upper opening and into the central cavity towards to the lower opening. The lens barrel moves through the central cavity towards to the lower opening until the one or more coupling protrusions engage the upper protrusion so that the one or more coupling protrusions are resting within the groove. As another example, the lens barrel may be positioned above the lens carrier and inserted into the lens carrier along a path that substantially follows an axis, e.g., the optical axis. When inserting the lens barrel into the lens carrier, the lens barrel may be inserted into the upper opening and through the central cavity of the lens carrier towards the lower opening until the downward facing surface of the upper protrusions engages with the seat of the lower protrusion.

At 706, the process 700 may include rotating the lens barrel about an optical axis to lock the lens barrel with the lens carrier. For example, the lens barrel may be rotated, relative to the lens carrier, clockwise or counterclockwise about the optical axis or the lens. In various embodiments, each of the one or more coupling protrusions may engage the upper protrusion and thus are resting within the groove. According to some embodiments, the groove may be an L-shaped groove. The L-shaped groove may extend circumferentially along a portion of exterior surface of the lens barrel in some embodiments. The lens barrel may be rotated, relative to the lens carrier, clockwise or counterclockwise about the optical axis so that at least a portion of the coupling protrusion(s) within the groove is not aligned with the respective space and engages with a lower protrusion when the lens barrel is moved in the upward z-direction in addition to engaging the upper protrusion when the lens barrel is moved in the downward z-direction. As another example, the lens barrel may be rotated, relative to the lens carrier, clockwise or counterclockwise about the optical axis or the lens.

At 708, the process 700 may include dispensing an adhesive 360 degrees around a gap within the coupling arrangement between the lens barrel and the lens carrier. For example, the adhesive may be dispensed 360 degrees around gap into the coupling arrangement. In some examples, the adhesive may be dispensed into the gap such that the adhesive travels to at least partially fill the gap within the coupling arrangement between the lens barrel and the lens carrier. In some instances, the gap may be widened using one or more chamfers positioned at the opening of the gap as described herein. As another example, the adhesive may be dispensed 360 degrees around the gap into the contacting arrangement and at least partially through the gap. In some examples, the adhesive may be dispensed into the gap such that the adhesive travels to at least partially fill the gap within the contacting arrangement between the lens barrel and the lens carrier. In some instances, the gap may be widened using one or more chamfers positioned at the opening of the gap as described herein.

At 710, the process 700 may include rotating the lens barrel about the optical axis to increase coverage of the adhesive on the engaging arrangement. For example, the lens barrel may be rotated relative to the lens carrier in the clockwise or counter-clockwise direction to more evenly distribute the adhesive 360 degrees around the coupling arrangement or the contacting arrangement. After the lens barrel is rotated, the lens barrel may be rotated to lock the lens barrel with the lens carrier.

At 712, the process 700 may include initiating one or more active alignment (AA) processes for a lens of the lens carrier. For example, a position of the lens barrel relative to an image sensor of the camera module may be adjusted to optically align the lens with the image sensor, at 710. In some cases, the adhesive may be cured, for example, before, during, and/or after performing optical alignment. As another example, the adhesive may be cured during and/or after dispensing the adhesive into the recess, e.g., if it is determined, at 708, not to perform optical alignment.

Figure 8:
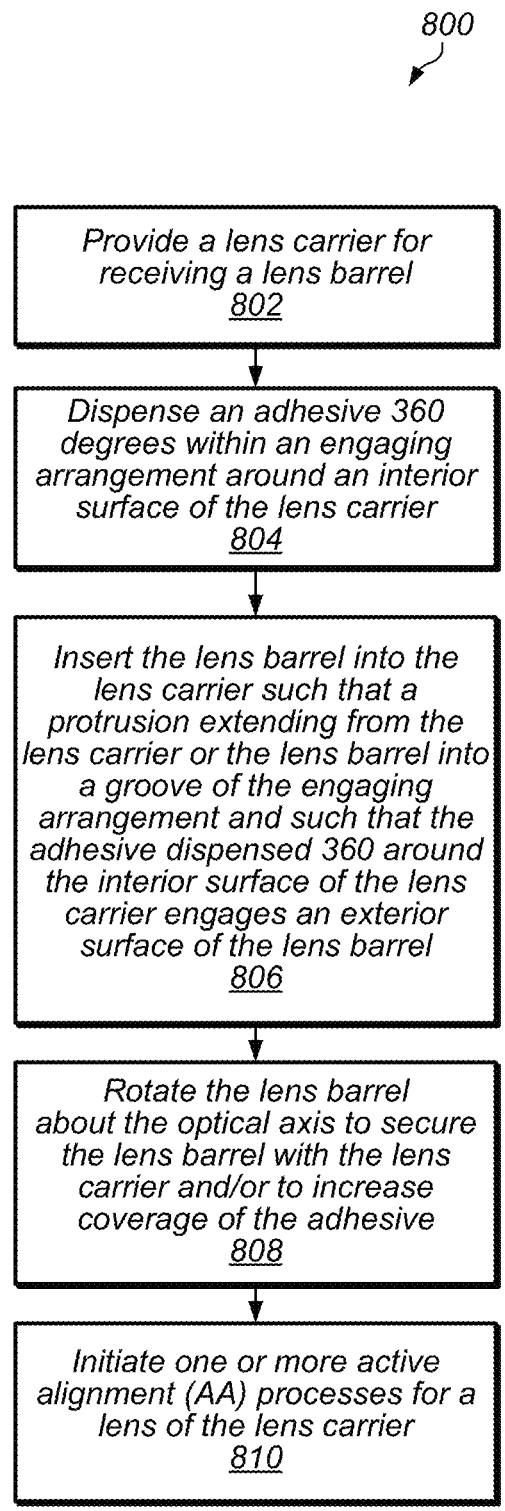
FIG. 8 is a flowchart of another example method of assembling a camera module having an engaging arrangement according to some aspects.

FIG. 8 illustrates a process flow diagram of an example process 800 for attaching a lens barrel to a lens carrier via an engaging arrangement according to some aspects. For clarity, the following discussion with respect to the process 800 of FIG. 8 will also refer to elements of FIGS. 1 and 2. For example, the engaging arrangement may include one of the coupling arrangement described herein or the contacting arrangement described herein. It should be understood, however, that in some embodiments the process 800 may include one or multiple features, components, and/or functionality of embodiments described herein with reference to FIGS. 1-7 and 9-11.

At 802, the method 800 may include providing a lens carrier for receiving a lens barrel. In some instances, the lens carrier may be the lens carrier 106 illustrated in FIG. 1 and the lens barrel may be the lens barrel 104 illustrated in FIG. 1. Additionally, or alternatively, the lens carrier may be the lens carrier 206 illustrated in FIG. 2 and the lens barrel may be the lens barrel 204 illustrated in FIG. 2. In some aspects, the lens carrier may be the lens carrier 506 illustrated in FIG. 5 and the lens barrel may be the lens barrel 504 illustrated in FIG. 5. Additionally, or alternatively, the lens carrier may be the lens carrier 606 illustrated in FIG. 6 and the lens barrel may be the lens barrel 604 illustrated in FIG. 6.

At 804, the method 800 may include dispensing an adhesive 360 degrees within an engaging arrangement around an interior surface of the lens carrier. For example, before inserting the lens barrel into the lens carrier, the adhesive may be dispensed or positioned continuously 360 degrees around an interior surface of the lens carrier at the coupling arrangement and/or at a coupling protrusion of the coupling arrangement. As another example, before inserting the lens barrel into the lens carrier, the adhesive may be dispensed 360 degrees around the contacting arrangement and/or at a lower protrusion of the contacting arrangement.

At 806, the method 800 may include inserting the lens barrel into the lens carrier such that a protrusion extending from the lens carrier or the lens barrel into a groove of the engaging arrangement and such that the adhesive dispensed 360 degrees around the interior of the lens carrier engages an exterior surface of the lens barrel. For example, the lens barrel may be positioned above the lens carrier and inserted into the lens carrier along a path that substantially follows an axis, e.g., the optical axis. When inserting the lens barrel into the lens carrier, the one or more lower protrusions may be oriented such that each respective space is aligned with a respective coupling protrusion. The lens barrel may be moved through the upper opening and into the central cavity towards to the lower opening. The lens barrel moves through the central cavity towards to the lower opening until the one or more coupling protrusions engage the upper protrusion so that the one or more coupling protrusions are resting within the groove. As another example, the lens barrel may be positioned above the lens carrier and inserted into the lens carrier along a path that substantially follows an axis, e.g., the optical axis. When inserting the lens barrel into the lens carrier, the lens barrel may be inserted into the upper opening and through the central cavity of the lens carrier towards the lower opening until the downward facing surface of the upper protrusions engages with the seat of the lower protrusion.

At 808, the method 800 may include rotating the lens barrel about the optical axis to secure the lens barrel with the lens carrier and/or to increase coverage of the adhesive. For example, the lens barrel may be rotated, relative to the lens carrier, clockwise or counterclockwise about the optical axis or the lens. In various embodiments, each of the one or more coupling protrusions may engage the upper protrusion and thus are resting within the groove. According to some embodiments, the groove may be an L-shaped groove. The L-shaped groove may extend circumferentially along a portion of exterior surface of the lens barrel in some embodiments. The lens barrel may be rotated, relative to the lens carrier, clockwise or counterclockwise about the optical axis so that at least a portion of the coupling protrusion(s) within the groove is not aligned with the respective space and engages with a lower protrusion when the lens barrel is moved in the upward z-direction in addition to engaging the upper protrusion when the lens barrel is moved in the downward z-direction. As another example, the lens barrel may be rotated, relative to the lens carrier, clockwise or counterclockwise about the optical axis or the lens. As yet another example, the lens barrel may be rotated relative to the lens carrier in the clockwise or counter-clockwise direction to more evenly distribute the adhesive 360 degrees around the coupling arrangement or the contacting arrangement.

At 810, the method 800 may include initiating one or more active alignment (AA) processes for a lens of the lens carrier. For example, a position of the lens barrel relative to an image sensor of the camera module may be adjusted to optically align the lens with the image sensor. In some cases, the adhesive may be cured, for example, before, during, and/or after performing optical alignment. As another example, the adhesive may be cured during and/or after dispensing the adhesive into the recess, e.g., if it is determined, at 808, not to perform optical alignment.

Figure 9:
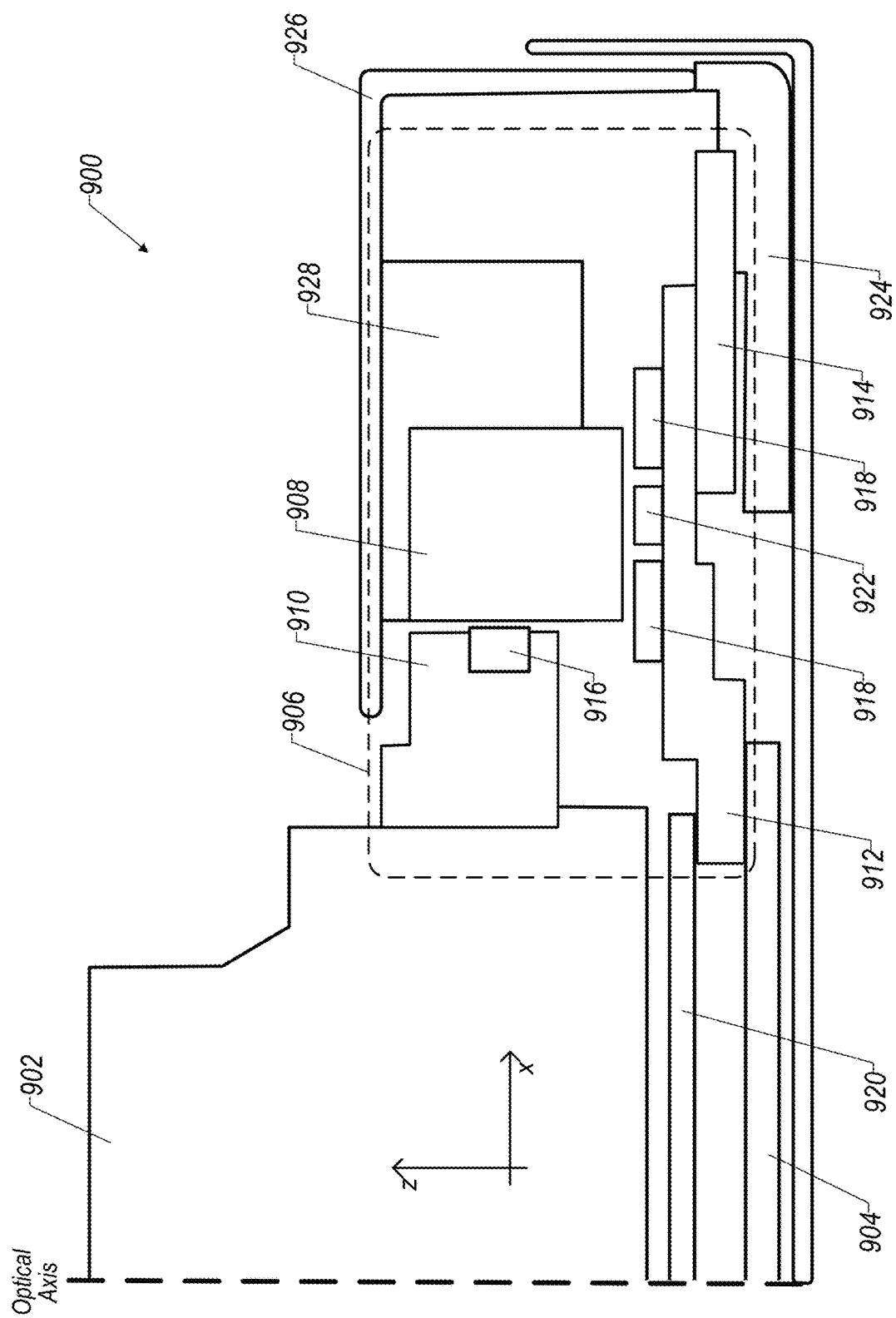
FIG. 9 illustrates a schematic cross-sectional side view of a portion of an example camera that may include one or more actuators and a sensor shift flexure arrangement for improved signal routing according to some aspects.

FIG. 9 illustrates a schematic cross-sectional side view of a portion of an example camera 900 that may include one or more actuators and a sensor shift flexure arrangement for improved signal routing, in accordance with some embodiments. In some embodiments, camera 900 may include a lens group 902, an image sensor 904, and a voice coil motor (VCM) actuator module 906. The lens group 902 may define an optical axis. The image sensor 904 may be configured to capture light passing through the lens group 902 and convert the captured light into image signals. In some cases, the VCM actuator module 906 may be one of multiple VCM actuator modules of the camera 900. For instance, the camera 900 may include four such VCM actuator modules 906, such as two pairs of VCM actuator modules 906 that oppose one another relative to the lens group 902. The VCM actuator modules 906 may be configured to move the lens group 902 along the optical axis (e.g., in the Z-axis direction, to provide autofocus (AF) functionality) and/or tilt the lens group 902 relative to the optical axis. Furthermore, the VCM actuator module(s) 906 may be configured to move the image sensor 904 in directions orthogonal to the optical axis (e.g., in the X-axis and/or Y-axis directions, to provide optical image stabilization (OIS) functionality).

In various embodiments, the VCM actuator module 906 may include a magnet 908 (e.g., a stationary single pole magnet), a lens holder 910, a substrate 912, a top flexure (not shown), and a bottom flexure 914. Furthermore, the VCM actuator module 906 may include an AF coil 916 and a bottom sensor positioning (SP) coil 918.

In some embodiments, the lens holder 910 may hold, or otherwise support, the AF coil 916 proximate a side of the magnet 908. The lens holder 910 may be coupled to the lens group 902 such that the lens group 902 shifts together with the lens holder 910.

In various embodiments, the substrate 912 may hold, or otherwise support, the bottom SP coil 918 proximate a bottom side of the magnet 908. The substrate 912 may be coupled to the image sensor 904 such that the image sensor 904 shifts together with the substrate 912. In some embodiments, the substrate 912 may also be coupled with, or may otherwise support, an infrared cut-off filter (IRCF) 920 (and/or one or more other optical elements), e.g., as indicated in FIG. 9.

In some embodiments, the VCM actuator module 906 may include a position sensor 922 (e.g., a Hall sensor) for position detection based on movement of the SP coil 918 in directions orthogonal to the optical axis. For example, the position sensor 922 may be located on the substrate 912 proximate to the SP coil 918.

The flexure 914 may be configured to provide compliance for motion of the substrate 912 in directions orthogonal to the optical axis. Furthermore, the flexure 914 may be configured to suspend the substrate 912 and the image sensor 904 from one or more stationary structures 924 of the camera 900.

The top flexure (not shown) may be configured to mechanically and electrically connect the lens holder 910 to the shield can 926 and/or to one or more other stationary structures (e.g., stationary structure 924). The top flexure may be configured to provide compliance for movement of the lens holder 910 along the optical axis and for tilt of the lens holder 910 relative to the optical axis. The shield can 926 may encase, at least in part, an interior of the camera 900. The shield can 926 may be a stationary component that is static relative to one or more moving components (e.g., the lens holder 910 and substrate 912).

In some embodiments, the stationary magnet 908 may be fixed to a stationary structure (e.g., magnet holder 928). In some examples, each of the AF coil 916 and the SP coil 918 may be a race track coil.

Electromagnetic interaction between the AF coil 916 and the magnet 908 may produce Lorentz forces that cause the lens holder 910 to move along the optical axis and/or to tilt relative to the optical axis. Electromagnetic interaction between the SP coil 918 and the magnet 908 may produce Lorentz forces that cause the substrate 912 to move in directions orthogonal to the optical axis. The lens group 902 may shift together with (e.g., in lockstep with) the lens holder 910. Furthermore, the image sensor 904 may shift together with (e.g., in lockstep with) the substrate 912.

As discussed herein, electrical contacts/connections may allow for electrical signals (e.g., image signals) to be conveyed from the image sensor 904 to a controller (not shown). For instance, the image sensor 904 may be in electrical contact with the substrate 912 via one or more contacts, and thus image signals may be conveyed from the image sensor 904 to the substrate 912. The image signals may be conveyed from the substrate 912 to one or more external components via the flexure 914 and a flex circuit. According to various examples, electrical contacts/connections may allow for current to be conveyed from the controller to the substrate 912 to drive the SP coil 918.

Figure 10:
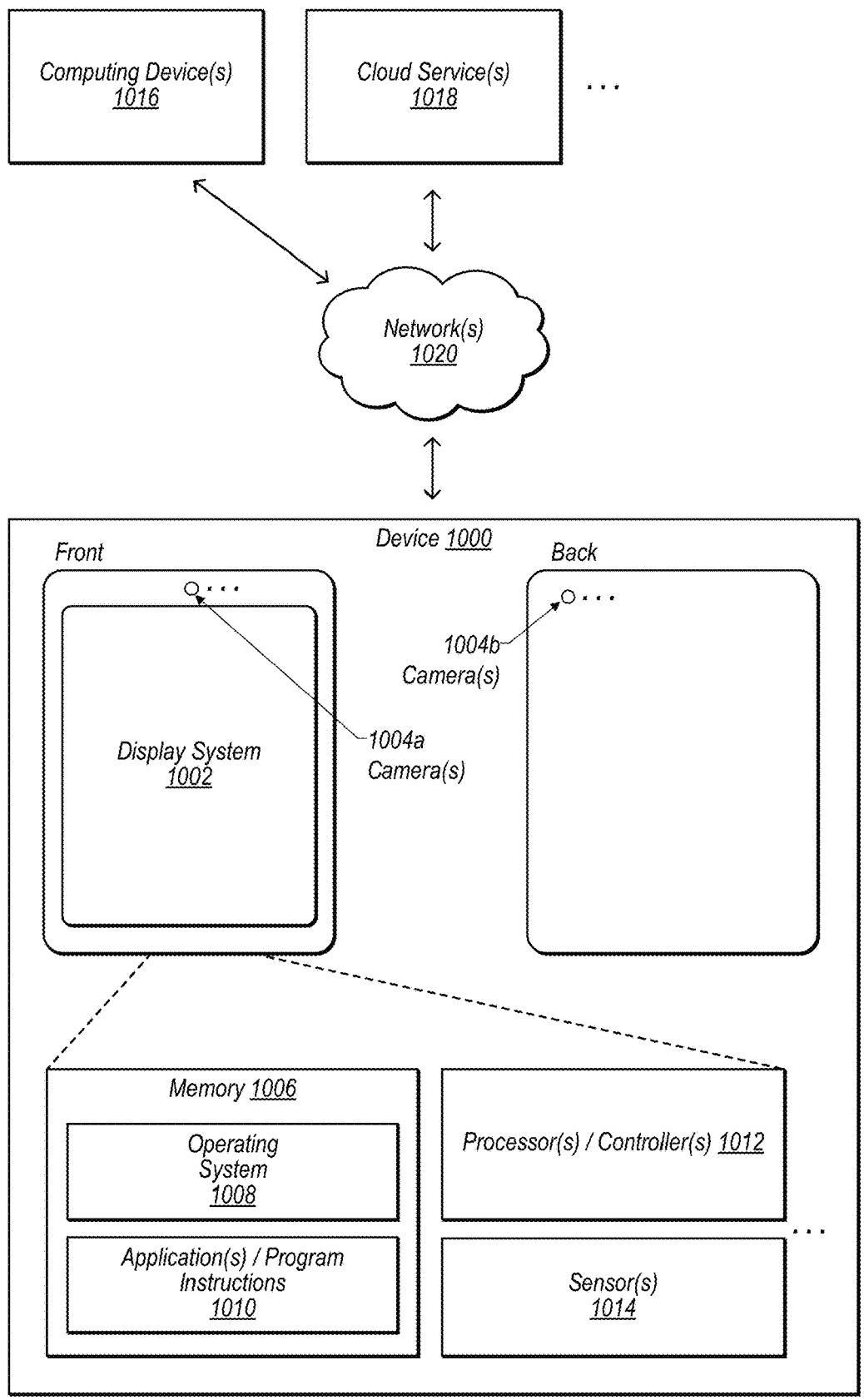
FIG. 10 illustrates a schematic representation of an example device that may include a camera with a sensor shift flexure arrangement for improved signal routing according to some aspects.

FIG. 10 illustrates a schematic representation of an example device 1000 that may include one or more cameras. For example, the device 1000 may include a camera system having an engagement arrangement, such as the camera systems and engagement arrangements described herein with reference to FIGS. 1-8. In some embodiments, the device 1000 may be a mobile device and/or a multifunction device. In various embodiments, the device 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 1000 may include a display system 1002 (e.g., comprising a display and/or a touch-sensitive surface) and/or one or more cameras 1004. In some non-limiting embodiments, the display system 1002 and/or one or more front-facing cameras 1004*a* may be provided at a front side of the device 1000, e.g., as indicated in FIG. 10. Additionally, or alternatively, one or more rear-facing cameras 1004*b* may be provided at a rear side of the device 1000. In some embodiments comprising multiple cameras 1004, some or all of the cameras 1004 may be the same as, or similar to, each other. Additionally, or alternatively, some or all of the cameras 1004 may be different from each other. In various embodiments, the location(s) and/or arrangement(s) of the camera(s) 1004 may be different than those indicated in FIG. 10.

Among other things, the device 1000 may include memory 1006 (e.g., comprising an operating system 1008 and/or application(s)/program instructions 1010), one or more processors and/or controllers 1012 (e.g., comprising CPU(s), memory controller(s), display controller(s), and/or camera controller(s), etc.), and/or one or more sensors 1014 (e.g., orientation sensor(s), proximity sensor(s), and/or position sensor(s), etc.). In some embodiments, the device 1000 may communicate with one or more other devices and/or services, such as computing device(s) 1016, cloud service(s) 1018, etc., via one or more networks 1020. For example, the device 1000 may include a network interface that enables the device 1000 to transmit data to, and receive data from, the network(s) 1020. Additionally, or alternatively, the device 1000 may be capable of communicating with other devices via wireless communication using any of a variety of communications standards, protocols, and/or technologies.

Figure 11:
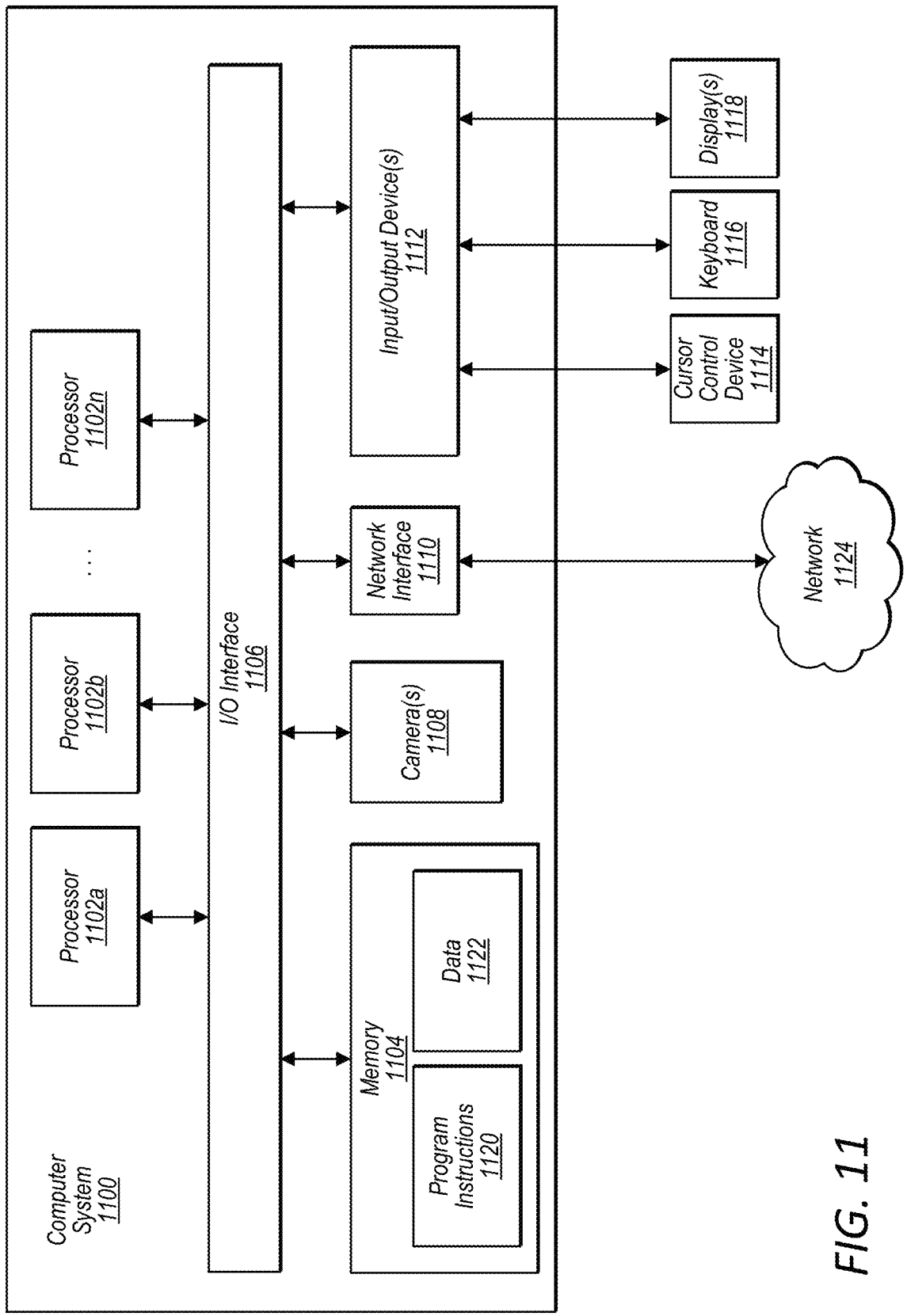
FIG. 11 illustrates a schematic block diagram of an example computer system that may include a camera with a sensor shift flexure arrangement for improved signal routing according to some aspects.

FIG. 11 illustrates a schematic block diagram of an example computer system 1100 that may include a camera having a sensor shift flexure arrangement for improved signal routing, e.g., as described herein with reference to FIGS. 1-10. In addition, computer system 1100 may implement methods for controlling operations of the camera and/or for performing image processing on images captured with the camera. In some embodiments, the device 1600 (described herein with reference to FIG. 10) may additionally, or alternatively, include some or all of the functional components of the described herein.

The computer system 1100 may be configured to execute any or all of the embodiments described above. In different embodiments, computer system 1100 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1100 includes one or more processors 1102 coupled to a system memory 1104 via an input/output (I/O) interface 1106. Computer system 1100 further includes one or more cameras 1108 coupled to the I/O interface 1106. Computer system 1100 further includes a network interface 1110 coupled to I/O interface 1106, and one or more input/output devices 1112, such as cursor control device 1114, keyboard 1116, and display(s) 1118. In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1102, or a multiprocessor system including several processors 1102 (e.g., two, four, eight, or another suitable number). Processors 1102 may be any suitable processor capable of executing instructions. For example, in various embodiments processors 1102 may be general-purpose or embedded processors implementing any of a variety of instruction set architectures (ISAs), such as the x86, PowerPC, SPARC, or MIPS ISAs, or any other suitable ISA. In multiprocessor systems, each of processors 1102 may commonly, but not necessarily, implement the same ISA.

System memory 1104 may be configured to store program instructions 1120 accessible by processor 1102. In various embodiments, system memory 1104 may be implemented using any suitable memory technology, such as static random access memory (SRAM), synchronous dynamic RAM (SDRAM), nonvolatile/Flash-type memory, or any other type of memory. Additionally, existing camera control data 1122 of memory 1104 may include any of the information or data structures described above. In some embodiments, program instructions 1120 and/or data 1122 may be received, sent or stored upon different types of computer-accessible media or on similar media separate from system memory 1104 or computer system 1100. In various embodiments, some or all of the functionality described herein may be implemented via such a computer system 1100.

In one embodiment, I/O interface 1106 may be configured to coordinate I/O traffic between processor 1102, system memory 1104, and any peripheral devices in the device, including network interface 1110 or other peripheral interfaces, such as input/output devices 1112. In some embodiments, I/O interface 1106 may perform any necessary protocol, timing or other data transformations to convert data signals from one component (e.g., system memory 1104 into a format suitable for use by another component (e.g., processor 1102). In some embodiments, I/O interface 1106 may include support for devices attached through various types of peripheral buses, such as a variant of the Peripheral Component Interconnect (PCI) bus standard or the Universal Serial Bus (USB) standard, for example. In some embodiments, the function of I/O interface 1106 may be split into two or more separate components, such as a north bridge and a south bridge, for example. Also, in some embodiments some or all of the functionality of I/O interface 1106, such as an interface to system memory 1104, may be incorporated directly into processors 1102.

Network interface 1110 may be configured to allow data to be exchanged between computer system 1100 and other devices attached to a network 1124 (e.g., carrier or agent devices) or between nodes of computer system 1100. Network 1124 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1110 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output device(s) 1112 may, in some embodiments, include one or more display terminals, keyboards, keypads, touchpads, scanning devices, voice or optical recognition devices, or any other devices suitable for entering or accessing data by one or more computer systems 1100. Multiple input/output devices 1112 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1110.

Those skilled in the art will appreciate that computer system 1100 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
a lens barrel to hold one or more lens elements that define an optical axis, wherein the lens barrel is configured to permit positioning of an adhesive around a continuous opening between the lens barrel and a lens carrier;
the lens carrier, wherein the lens carrier attaches to the lens barrel at least partially via an engaging arrangement; and
the adhesive, wherein the adhesive is positioned continuously around the continuous opening at the engaging arrangement between the lens barrel and the lens carrier,
wherein the engaging arrangement prevents movement of the lens barrel relative to the lens carrier along at least one direction of the optical axis and includes:
a groove, defined by the lens barrel or the lens carrier, that extends around an entire circumference of the engaging arrangement within a plane orthogonal to the optical axis, and
a protrusion that extends from the lens barrel or the lens carrier and at least partially into the groove.

2. The device of claim 1, wherein the groove forms a seat on the lens barrel or the lens carrier, wherein the protrusion forms a surface that rests against the adhesive on the seat, and wherein the seat and the surface are positioned at an angle that is not perpendicular to the optical axis.

3. The device of claim 1, wherein the engaging arrangement further includes:
a circumferential opening at a proximal end of the engaging arrangement between the lens barrel and lens carrier for positioning the adhesive continuously around the inner opening of the lens carrier at the engaging arrangement, wherein the circumferential opening is perpendicular to the optical axis.

4. The device of claim 3, wherein at least one chamfer on the lens carrier and at least one chamfer on the lens barrel forms the circumferential opening.

5. The device of claim 3, wherein the circumferential opening leads to a circumferential channel between the lens barrel and the lens carrier that is sized such that, when the adhesive is positioned continuously around the inner opening of the lens carrier, the adhesive traverses the circumferential channel to at least partially fill the circumferential channel at the engaging arrangement between the lens barrel and the lens carrier.

6. The device of claim 1, wherein compression of the adhesive in a direction that is parallel to the optical axis and between at least the groove and the protrusion inhibits delamination of the adhesive.

7. The device of claim 1, wherein the adhesive includes:
at least a first portion that is in compression between the lens barrel and the lens carrier when force is applied to the lens barrel in a first direction that is parallel to the optical axis; and
at least a second portion that is in compression between the lens barreland the lens carrier when force is applied to the lens barrel in a second direction that is opposite the first direction.

8. The device of claim 1, wherein:
the groove is a first groove;
the protrusion is a first protrusion;
the engaging arrangement further comprises:

a second groove defined by the lens barrel or the lens carrier, wherein the second groove is opposite the first groove with respect to the lens barrel; and a second protrusion that extends from the lens barrel or the lens carrier to at least partially into the second groove, wherein the second protrusion is opposite the first protrusion with respect to the lens barrel.

9. The device of claim 1, wherein:

the device is a mobile multifunction device; and the device further comprises:
   a display;
   a camera module, including:
      the lens barrel;
      the lens carrier having an autofocus (AF) coil;
      the engaging arrangement;
      an image sensor configured to capture light passing through the one or more lens elements and covert the captured light into image signals; and
      a lens actuator to move the lens carrier relative to the image sensor; and
   one or more processors to:
      cause the lens actuator to move the lens carrier relative to the image sensor; and
      cause the display to present an image based at least in part on one or more of the image signals from the image sensor.

10. A camera module, comprising:

one or more lens elements that define an optical axis;

a lens barrel that holds the one or more lenses, wherein the lens barrel is configured to permit positioning of an adhesive around a continuous opening between the lens barrel and a lens carrier;

the lens carrier;

an engaging arrangement to attach the lens barrel to the lens carrier; and the adhesive, wherein the adhesive is uniformly dispensed around an opening between the lens barrel and the lens carrier, wherein the engaging arrangement restricts movement of the lens barrel relative to the lens carrier along at least one direction of the optical axis and includes:
   a groove, defined by the lens barrel or the lens carrier, that extends around an entire circumference of the engaging arrangement within a plane orthogonal to the optical axis, and
   a protrusion that extends from the lens barrel or the lens carrier and at least partially into the groove.

11. The camera module of claim 10, wherein the groove forms a seat on the lens barrel or the lens carrier, wherein the protrusion forms a surface that rests on the seat, and wherein the seat and the surface are positioned at an angle that is not perpendicular to the optical axis.

12. The camera module of claim 10, wherein the engaging arrangement further includes:
   a circumferential opening at a proximal end of the engaging arrangement between the lens barrel and lens carrier for uniformly dispensing the adhesive around the inner opening of the lens carrier at the engaging arrangement, wherein the circumferential opening is perpendicular to the optical axis.

13. The camera module of claim 12, wherein at least one chamfer on the lens carrier and at least one chamfer on the lens barrel forms the circumferential opening.

14. The camera module of claim 12, wherein the circumferential opening leads to a circumferential channel between the lens barrel and the lens carrier that is sized such that, when the adhesive is uniformly dispensed around the inner opening of the lens carrier, the adhesive traverses the circumferential channel to at least partially fills the circumferential channel at the engaging arrangement between the lens barrel and the lens carrier.

15. The camera module of claim 10, wherein compression of the adhesive in a direction that is parallel to the optical axis and between at least the groove and the protrusion inhibits delamination of the adhesive.

16. The camera module of claim 10, wherein the adhesive includes:
   at least a first portion that is in compression between the lens barrel and the lens carrier when force is applied to the lens barrel in a first direction that is parallel to the optical axis; and
   at least a second portion that is in compression between the lens barrel and the lens carrier when force is applied to the lens barrel in a second direction that is opposite the first direction.

17. The camera module of claim 10, wherein:

the groove is a first groove;

the protrusion is a first protrusion;

the engaging arrangement further comprises:
   a second groove defined by the lens barrel or the lens carrier, wherein the second groove is opposite the first groove with respect to the lens barrel; and
   a second protrusion that extends from the lens barrel or the lens carrier to at least partially into the second groove, wherein the second protrusion is opposite the first protrusion with respect to the lens barrel.

18. A method of assembling a camera module having an engaging arrangement, the method comprising:
   inserting a lens barrel at least partially into a lens carrier such that a protrusion of the engaging arrangement extends from the lens barrel or the lens carrier and at least partially into a first portion of a groove of the engaging arrangement, wherein the lens barrel is configured to permit positioning of an adhesive around a continuous opening between the lens barrel and lens carrier, wherein the engaging arrangement restricts movement of the lens barrel relative to the lens carrier along at least one direction of an optical axis defined by one or more lens elements held by the lens barrel, and wherein the groove is defined by the lens barrel or the lens carrier and extends around an entire circumference of the engaging arrangement within a plane orthogonal to the optical axis;
   positioning the adhesive continuously around the continuous opening between the lens barrel and the lens carrier; and
   rotating the lens barrel about the optical axis defined by the one or more lens elements held by the lens barrel.

19. The method of claim 18, wherein rotating the lens barrel about the optical axis defined by the one or more lens elements held by the lens barrel comprises rotating the lens barrel about the optical axis defined by the one or more lens elements held by the lens barrel such that the protrusion extends at least partially into a second portion of the groove.

20. The method of claim 18, wherein the adhesive is positioned continuously around the inner opening of the lens carrier at the engaging arrangement before the lens barrel is at least partially inserted into the lens carrier such that the protrusion of the engaging arrangement extends from the lens barrel or the lens carrier and at least partially into the first portion of the groove of the engaging arrangement.

* * * * *